(12) United States Patent
Shea et al.

(10) Patent No.: US 11,223,470 B1
(45) Date of Patent: Jan. 11, 2022

(54) POST-QUANTUM CRYPTOGRAPHY SIDE CHAIN

(71) Applicant: Wells Fargo Bank, N.A., San Francisco, CA (US)

(72) Inventors: Brad A. Shea, San Francisco, CA (US); Jeff J. Stapleton, San Francisco, CA (US); Robert L. Carter, Jr., San Francisco, CA (US); Pierre Arbajian, San Francisco, CA (US); Peter Bordow, San Francisco, CA (US); Michael Erik Meinholz, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 102 days.

(21) Appl. No.: 16/810,972

(22) Filed: Mar. 6, 2020

(51) Int. Cl.
| H04L 29/06 | (2006.01) |
| H04L 9/06 | (2006.01) |
| H04L 9/08 | (2006.01) |
| H04L 9/32 | (2006.01) |

(Continued)

(52) U.S. Cl.
CPC .......... *H04L 9/0637* (2013.01); *G06F 21/602* (2013.01); *G06N 10/00* (2019.01); *H04L 9/0852* (2013.01); *H04L 9/3247* (2013.01); H04L 2209/38 (2013.01)

(58) Field of Classification Search
None
See application file for complete search history.

(56) References Cited

U.S. PATENT DOCUMENTS

| 7,277,870 B2 | 10/2007 | Mourad et al. |
| 7,822,690 B2 | 10/2010 | Rakowicz et al. |
| 8,396,838 B2 | 3/2013 | Brockway et al. |

(Continued)

FOREIGN PATENT DOCUMENTS

| CN | 105933281 A | 9/2016 |
| CN | 108965344 A | 12/2018 |

(Continued)

OTHER PUBLICATIONS

"Acronis Partners with ID Quantique to Bring Quantum-Safe Encryption to Cloud Data Protection," EFYTimes.com, Athena Information Solutions Pvt. Ltd., 3 pages, (2015).

(Continued)

*Primary Examiner* — Andrew J Steinle
(74) *Attorney, Agent, or Firm* — Alston & Bird LLP

(57) ABSTRACT

A computing entity accesses one or more blocks of a blockchain, encrypts the content of the one or more blocks using a first cryptographic technique to generate one or more first encrypted block values, and writes a first side chain block comprising the one or more first encrypted block values and a first signature to a first side chain. The computing entity accesses at least one of (a) at least one block of a particular second set of one or more second sets of the plurality of blocks or (b) one or more first side chain blocks corresponding to blocks of the second set, encrypts the content of the accessed block(s) using a second cryptographic technique to generate at least one second encrypted block value, and writes a second side chain block comprising the at least one second encrypted block value and a second signature to a second side chain.

20 Claims, 12 Drawing Sheets

(51) Int. Cl.
*G06N 10/00* (2019.01)
*G06F 21/60* (2013.01)

(56) References Cited

U.S. PATENT DOCUMENTS

| | | | |
|---|---|---|---|
| 8,842,839 | B2 | 9/2014 | Harrison et al. |
| 9,049,010 | B2 | 6/2015 | Jueneman et al. |
| 9,177,157 | B2 | 11/2015 | Binder |
| 9,191,198 | B2 | 11/2015 | Harrison et al. |
| 9,369,445 | B2 | 6/2016 | Mahajan et al. |
| 9,455,827 | B2 | 9/2016 | Tanizawa et al. |
| 10,025,941 | B1 | 7/2018 | Griffin et al. |
| 10,043,035 | B2 | 8/2018 | Lafever et al. |
| 10,108,954 | B2 | 10/2018 | Dunlevy et al. |
| 10,114,963 | B1 | 10/2018 | Griffin et al. |
| 10,114,980 | B2 | 10/2018 | Barinov et al. |
| 10,241,930 | B2 | 3/2019 | Eperiesi-Beck |
| 10,264,072 | B2 | 4/2019 | Crofton et al. |
| 10,419,209 | B1 | 9/2019 | Griffin et al. |
| 10,929,842 | B1* | 2/2021 | Arvanaghi .............. H04L 67/10 |
| 2009/0031135 | A1 | 1/2009 | Kothandaraman |
| 2016/0028605 | A1 | 1/2016 | Gil et al. |
| 2016/0248586 | A1 | 8/2016 | Hughes et al. |
| 2017/0046531 | A1 | 2/2017 | Roberts |
| 2017/0132630 | A1* | 5/2017 | Castinado ............ G06Q 20/382 |
| 2017/0324550 | A1 | 11/2017 | Yuan et al. |
| 2018/0205546 | A1 | 7/2018 | Haque et al. |
| 2018/0351734 | A1 | 12/2018 | Zhao et al. |
| 2019/0014176 | A1 | 1/2019 | Tormasov et al. |
| 2019/0044916 | A1 | 2/2019 | Jones |
| 2019/0058581 | A1* | 2/2019 | Wood ..................... G06F 16/27 |
| 2019/0116035 | A1 | 4/2019 | Mustafa et al. |
| 2019/0132350 | A1 | 5/2019 | Smith et al. |
| 2020/0044827 | A1* | 2/2020 | Snow ..................... G06F 21/64 |

FOREIGN PATENT DOCUMENTS

| | | |
|---|---|---|
| EP | 3477527 A1 | 5/2019 |
| WO | 2018/014103 A1 | 1/2018 |
| WO | 2019/069103 A1 | 4/2019 |
| WO | 2019/071026 A1 | 4/2019 |

OTHER PUBLICATIONS

"Applied Quantum-Safe Security: Quantum-Resistant Algorithms and Quantum Key Distribution," Cloud Security Alliance, 19 pages, (2017).

"New iOS app secures IM with 'post quantum' encryption," Open Source Convergence, 8 pages, (2014).

"SafeNet ProtectApp: Application-Level Encryption and Key Management Interface [product brief]," Gemalto, a Thales Company, 2 pages, (2019).

Bos et al., "Frodo: Take off the ring! Practical, Quantum-Secure Key Exchange from LWE," Proceedings of the 23rd ACM Conference on Computer and Communications Security, 26 pages, (2017).

Parmar and Verma, "A Comparative Evaluation of Algorithms in the Implementation of an Ultra-Secure Router-to-Router Key Exchange System," Hindawi, Security and Communication Networks, 2017:1467614, 7 pages, (2017).

Shalom, Rami, "Protecting Your Critical data: StorageSecure & KeySecure," SafeNet, 16 pages, (2019).

Stebila and Mosca, "Post-Quantum Key Exchange for the Internet and the Open Quantum Safe Project," International Conference on Selected Areas in Cryptography, Selected Areas in Cryptography—SAC 2016, 22 pages, (2017).

Xu et al., "A Pattern Collection for Blockchain-based Applications," Association for Computing Machinery, 1(1): 33 pages, (2018).

* cited by examiner

POST-QUANTUM CRYPTOGRAPHY SIDE CHAIN

TECHNOLOGICAL FIELD

Example embodiments of the present disclosure relate generally to cryptography and, more particularly, to systems and methods for providing post-quantum cryptography (PQC). For example, example embodiments relate to the storage of PQC protected information/data by a third party.

BACKGROUND

Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities. However, this heightened interest and investment has yet to produce an enduring and functional quantum computer outside of a laboratory environment.

Nonetheless, there is widespread agreement among experts that quantum computers will disrupt current security protocols that protect global financial markets and governmental institutions. For example, most common public-key cryptography schemes, such as the widely-used Rivest-Shamir-Adleman (RSA) and Diffie-Hellman (DH) schemes, rely on the inability of classical computers to complete certain types of complex mathematical calculations, such as integer factorization and discrete logarithm computation, respectively, within a reasonable amount of time. However, a quantum computer implementing Shor's algorithm potentially could complete these complex calculations in a relatively short time and thereby determine the private keys used for current public-key systems from the corresponding public keys. Accordingly, there is an urgent need for data owners and hosting services to begin migrating their data and upgrading their systems to use quantum-resistant algorithms before quantum computing capabilities are realized. Moreover, as Cloud-based computing and Cloud-based data storage becomes more prevalent, it will be important for data owners to be able to secure their data even when that data is stored by a third party (e.g., in Cloud-based storage).

BRIEF SUMMARY

Computing systems, computing apparatuses, computer-implemented methods, and computer program products are disclosed herein for improved security of data stored by third parties. For example, various embodiments provide computing systems, computing apparatuses/entities, computer-implemented methods, and/or computer program products corresponding to the secure storage of data in third party operated computer readable memory. In various embodiments, post-quantum cryptography (PQC) encryption techniques are used to aid in securing the third party-stored data.

According to a first aspect of the present disclosure, a method for operating a ledger system is provided. In an example embodiment, the method comprises accessing, by a computing entity, one or more blocks of a blockchain comprising a plurality of blocks, the plurality of blocks comprising one or more non-overlapping first sets of blocks. Each first set of blocks comprises a first number of consecutive blocks. The one or more blocks are from a particular one of the one or more first sets. The method further comprises encrypting, by the computing entity, the content of the one or more blocks using a first cryptographic technique to generate one or more first encrypted block values; and writing, by the computing entity, a first side chain block comprising the one or more first encrypted block values and a first signature to a first side chain. The method further comprises accessing, by the computing entity, at least one of (a) at least one block of a particular second set of one or more second sets of the plurality of blocks or (b) one or more first side chain blocks corresponding to blocks of the particular second set. The second sets of blocks are mutually non-overlapping and each second set of blocks comprises a second number of consecutive blocks of the plurality of blocks. The method further comprises encrypting, by the computing entity, the content of at least one of (a) the at least one block or (b) the one or more first side chain blocks using a second cryptographic technique to generate at least one second encrypted block value; and writing, by the computing entity, a second side chain block comprising the at least one second encrypted block value and a second signature to a second side chain.

According to another aspect of the present disclosure, an apparatus is provided. In an example embodiment, the apparatus comprises processor circuitry. The processor circuitry is configured to access one or more blocks of a blockchain comprising a plurality of blocks. The plurality of blocks comprise one or more non-overlapping first sets of blocks. Each first set of blocks comprises a first number of consecutive blocks. The one or more blocks are from a particular one of the one or more first sets of blocks. The processor circuitry is further configured to encrypt the content of the one or more blocks using a first cryptographic technique to generate one or more first encrypted block values; and write a first side chain block comprising the one or more first encrypted block values and a first signature to a first side chain. The processor circuitry is further configured to access at least one of (a) at least one block of a particular second set of one or more second sets of the plurality of blocks or (b) one or more first side chain blocks corresponding to blocks of the particular second set. The second sets of blocks are mutually non-overlapping and each second set of blocks comprises a second number of consecutive blocks of the plurality of blocks. The processor circuitry is further configured to encrypt the content of at least one of (a) the at least one block or (b) the one or more first side chain blocks using a second cryptographic technique to generate at least one second encrypted block value; and write a second side chain block comprising the at least one second encrypted block value and a second signature to a second side chain.

According to yet another aspect of the present disclosure, a computer program product is provided. In an example embodiment, the computer program product comprises at least one non-transitory storage media storing executable instructions. The executable instructions comprise executable code portions configured to, when executed by the processing circuitry of an apparatus, cause the apparatus to access one or more blocks of a blockchain comprising a plurality of blocks. The plurality of blocks comprise one or more non-overlapping first sets of blocks. Each first set of blocks comprises a first number of consecutive blocks. The one or more blocks are from a particular one of the one or more first sets of blocks. The executable instructions comprise executable code portions are further configured to, when executed by the processing circuitry of an apparatus, cause the apparatus to encrypt the content of the one or more blocks using a first cryptographic technique to generate one or more first encrypted block values; and write a first side chain block comprising the one or more first encrypted block values and a first signature to a first side chain. The executable instructions comprise executable code portions are further configured to, when executed by the processing circuitry of an apparatus, cause the apparatus to access at least one of (a) at least one block of a particular second set of one or more second sets of the plurality of blocks or (b) one or more first side chain blocks corresponding to blocks of the particular second set. The second sets of blocks are mutually non-overlapping and each comprise a second number of consecutive blocks of the plurality of blocks. The executable instructions comprise executable code portions are further configured to, when executed by the processing circuitry of an apparatus, cause the apparatus to encrypt the content of at least one of (a) the at least one block or (b) the one or more first side chain blocks using a second cryptographic technique to generate at least one second encrypted block value; and write a second side chain block comprising the at least one second encrypted block value and a second signature to a second side chain.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
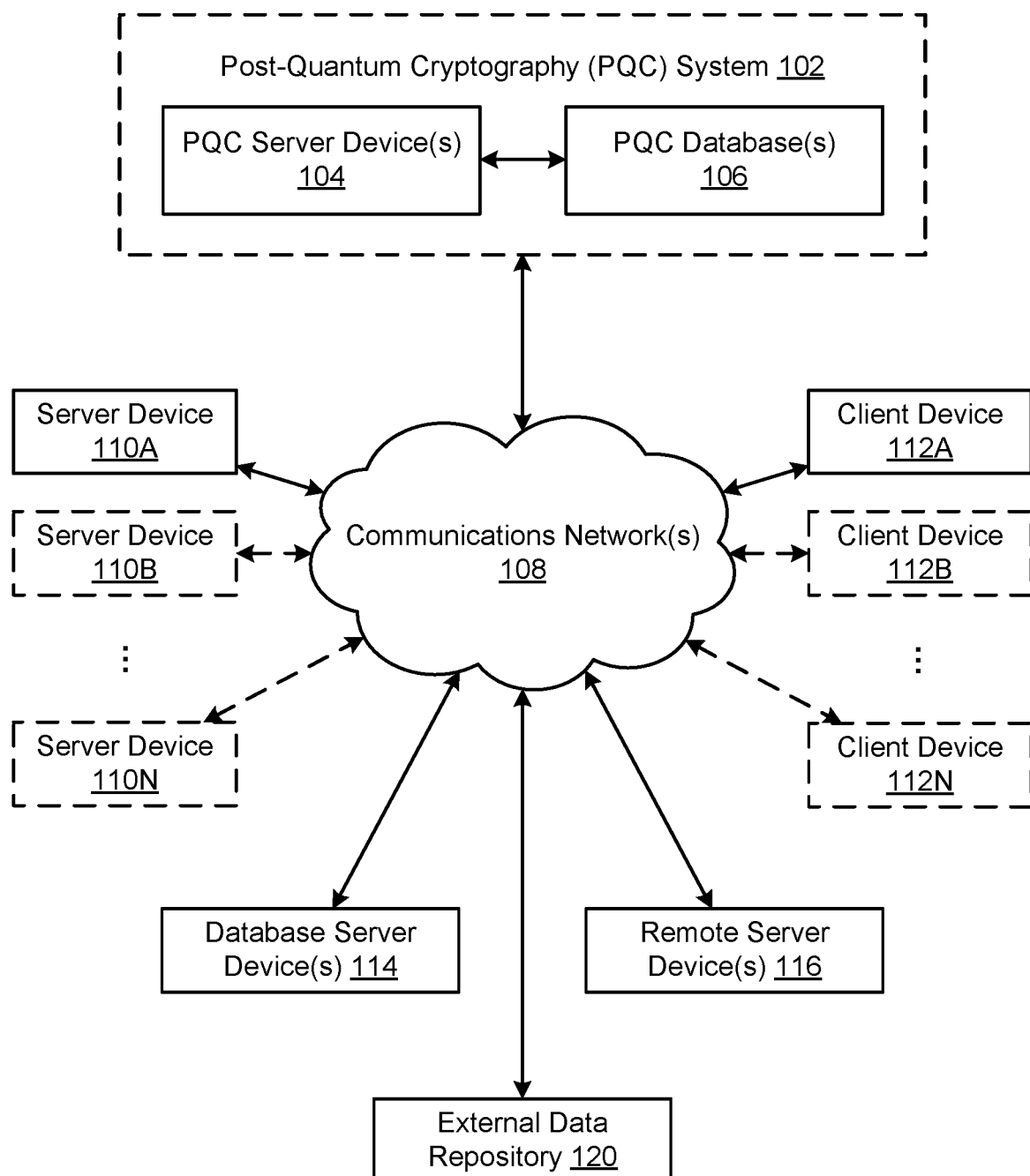
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for secure storage of data by an external data repository, such as a Cloud-based storage system and/or other third party operated data storage. Various embodiments provide for secured storage of data by an external data repository that is secure against cryptanalytic algorithms implemented on a quantum computer.

Traditionally, data owners and third-party hosting services use hybrid cryptosystems to safeguard the confidentiality, integrity, and authenticity of enormous volumes of protected data and complex IT systems. These hybrid cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a modern hybrid cryptosystem is the Transport Layer Security (TLS) protocol, which relies on asymmetric cryptography for authentication and key management to establish session keys, and symmetric cryptography for session encryption and integrity validation.

However, these cryptosystems are vulnerable to cryptanalysis algorithms and/or attack algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that the keys determined based on those solutions are still in use. For example, keys may be periodically changed such that if it takes a long time to determine a key using a cryptanalysis algorithm, the key may no longer be in use by the time the key has been determined. However, if the key may be determined quickly via the cryptanalysis algorithm, the key may still be in use and the determined key may be used to gain unauthorized access to information encrypted and/or digital signatures/certificates may be counterfeited via the determined key.

In one illustrative example, a quantum computer implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

In another illustrative example, a quantum computer implementing Grover's algorithm could effectively perform an exhaustive key search because Grover's algorithm provides quadratic speedup and thereby could brute-force attack an N-bit symmetric cryptographic key in only about $2^{(N/2)}$ iterations. In some instances, for symmetric cryptographic techniques that support longer and/or multiple key lengths (e.g., AES supports three key lengths a 128-bit key, 192-bit key, and 256-bit key), increasing the key length of the symmetric cryptographic key may provide sufficient protection against Grover's algorithm because a brute-force attack on a 2N-bit symmetric cryptographic key would require about $2^N$ iterations. For example, a 256-bit symmetric cryptographic key (e.g., AES-256) may only provide 128 bits of security in a quantum computing environment. However, any migration plan that involves increasing the key length of the symmetric cryptographic key must also evaluate the impact of the longer key length on the performance of related applications and the additional requirements of computational resources.

Although quantum computers capable of such feats are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoard the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data.

These risks are amplified by the lengthy data retention requirements (e.g., security shelf-life) mandated by government agencies, such as the U.S. Federal Deposit Insurance Corporation (FDIC). For example, some data records may need to be securely retained for decades or longer.

Given that data is a highly valuable asset, especially in the financial industry, there is an urgent need for data owners and hosting services to initiate the process of protecting their valuable customer information and digital assets even before quantum computing capabilities are realized. Moreover, as Cloud-based data storage and other external data repository use becomes more prevalent, data owners may wish to provide further protection for their data assets stored by external data repositories (e.g., data repositories that are operated by entities other than the data owner). This process primarily involves migrating data and systems to algorithms that are thought to be quantum-resistant. In an attempt to promulgate quantum-resistant algorithms, the National Institute of Standards and Technology (NIST), a federal agency within the U.S. Department of Commerce, has initiated the NIST Post-Quantum Cryptography Standardization Process to solicit, evaluate, and standardize one or more quantum-resistant public-key cryptographic algorithms. At present, there are many different candidate cryptographic algorithms believed to be quantum-resistant. However, because the standardization process is not yet complete, migration of classical systems to any one of NIST's candidate cryptographic algorithms could later compound the computational and resource burden on data owners and hosting services if NIST does not select that particular cryptographic algorithm as the standard or makes changes to the proposed cryptographic algorithms.

Although some quantum-resistant cryptographic algorithms are available today, those algorithms may not be the algorithm, or a variant of the algorithm, that eventually is approved as part of the NIST Post-Quantum Cryptography Standardization Process. Moreover, the adoption of these algorithms will, in some instances, be an overly complex and time-consuming process. First, this migration process is challenging due to the sheer volume of data consumed by these systems, as well as the general complexity of the systems. For example, financial services providers and their partners each may have data for millions of customers and trillions of transactions stored in various databases. In addition, these providers are processing millions of transactions on a daily basis and adding new customer data to their systems. Second, data is stored in more places than ever before and must be encrypted using different cryptographic keys depending upon whether the data is going to be protected while in transit, while at rest in-cloud, or while at rest on-premises. Governmental regulations, NIST recommendations, and industry standards and best practices will, in some instances, drive the cryptographic techniques that are used to encrypt the data. Third, many organizations use several types of encryption, hashing, and other cryptographic algorithms with varying security architecture depending on the needs of the data owner or hosting service. Fourth, as various data records are required by government agencies to be securely retained for long periods of time (e.g., decades or longer), there is the need to protect data for varying durations to manage legal and regulatory risk, sometimes as long as twenty to thirty years, and even in some cases for over fifty years. Fifth, the deployment of fundamental changes to infrastructure might take a decade or more, and there is very little tolerance for incurring risk while deploying changes. All of these considerations introduce additional levels of complexity, and thus data owners and hosting services must methodically migrate their cryptographic infrastructure to quantum-resistant cryptography. In addition, the cryptography transition is challenging because it is not restricted only to algorithms and key lengths. Rather, the cryptography transition is impacted by several other details of security infrastructure, such as interoperability, integration with existing systems and security architectures, scalability, compliance and regulatory requirements, maintenance, and backward compatibility requirements.

In contrast to conventional cryptographic systems, the present disclosure relates to a post-quantum cryptography (PQC) system that mitigates the vulnerability of traditional cryptographic algorithms by providing techniques for migrating enormous volumes of data and complex IT systems to PQC technologies and platforms that are not vulnerable to attack by a quantum computer. The term "PQC" refers to cryptosystems which are, or are considered to be, resistant to attacks that use a quantum computer for cryptanalysis. In some embodiments, PQC techniques include PQC communications channel-based cryptographic techniques, hash-based PQC techniques, lattice-based PQC techniques, isogeny-based PQC techniques, code-based PQC techniques, multivariate-based PQC techniques, zero-knowledge proof PQC techniques, other suitable techniques, and combinations thereof (e.g., combinations of PQC communications channel-based cryptographic techniques with hash-based, lattice-based, isogeny-based, code-based, multivariate-based, or zero-knowledge proof PQC techniques).

Hash-based PQC techniques (e.g., hash-based PQC cryptographic signatures) are suitable for one-time use, wherein a tuning parameter provides a trade-off between signature size and key generation, signing, and verification speed, and can be can be used with any secure hashing function. Hash-based PQC techniques may be used to provide digital signatures, such as Leighton-Micali Signature (LMS), eXtended Merkle Signature Scheme (XMSS), and SPHINCS+.

Lattice-based PQC techniques are based on the shortest vector problem, the leading replacement for prime factorization and discrete logarithm, and typically are less computationally resource intensive in relation to isogeny-based and other PQC techniques. In some instances, lattice-based PQC techniques may be used to provide digital signatures, such as Dilithium and qTESLA. In some instances, lattice-based PQC techniques may be used to provide key exchange by key encapsulation, such as NewHope, Frodo Key-Encapsulation Mechanisms (FrodoKEM), Nth degree-Truncated polynomial Ring Units (NTRU) Prime, and Kyber. In some instances, lattice-based PQC techniques may be used to provide key exchange by key agreement, such as NewHope Classic, Frodo Diffie-Hellman (FrodoDH), and Ring Learning With Errors Key EXchange (RLWE-KEX).

Isogeny-based PQC techniques use very small keys and typically are more computationally resource intensive in relation to lattice-based and other PQC techniques. In some instances, isogeny-based PQC techniques may be used to provide key exchange by key encapsulation, such as Supersingular Isogeny Key Encapsulation (SIKE). In some instances, isogeny-based PQC techniques may be used to provide key exchange by key agreement, such as Supersingular isogeny Diffie-Hellman (SIDH) key exchange.

Code-based PQC techniques use very large key sizes yet are typically the fastest PQC techniques at the comparable security level (e.g., extremely fast in encryption and reasonably fast in decryption). In some instances, code-based PQC techniques may be used to provide key exchange by key encapsulation, such as Classic McEliece, McEliece Quasi-Cyclic Moderate Density Parity Check (QC-MDPC), and Bit Flipping Key Encapsulation (BIKE).

Multivariate-based PQC techniques use small public keys and fast verification yet, in some instances, are less efficient than other PQC techniques. Multivariate-based PQC techniques may be used to provide digital signatures, such as Rainbow.

Zero-knowledge proof PQC techniques use very small key pairs and derive their security entirely from the security of symmetric-key primitives and are believed to be quantum-secure. In some instances, zero-knowledge proof PQC techniques may be used to provide digital signatures, such as Picnic.

In some embodiments, the PQC system may retrieve one or more of the hash-based PQC techniques, lattice-based PQC techniques, isogeny-based PQC techniques, code-based PQC techniques, multivariate-based PQC techniques, and zero-knowledge proof PQC techniques from a remote server or data storage device, such as the ISARA toolkit, the libOQS library, the libpqcrypto library, or a combination thereof.

PQC communications channel-based cryptographic techniques use PQC communications channels to secure transmission of sensitive or confidential message data, such as Society for Worldwide Interbank Financial Telecommunication (SWIFT) messages, International Organization for Standardization (ISO) 8583 messages, ISO 20022 messages, Internet of Things (IoT) data, Health Insurance Portability and Accountability Act (HIPAA) data (e.g., electronic medical records, protected health information), copyrighted content (e.g., electronic media, digital rights management (DRM)-protected data files), and other suitable messages. For example, the PQC system may be configured to implement a PQC communications protocol that transmits a first portion of an electronic communication (e.g., message overhead data such as protocol overhead, header data, metadata) to a client device over a first classical communications channel (e.g. non-PQC communications channel) and transmits a second portion of the electronic communication (e.g., message payload data) to the client device over a second classical communications channel (e.g., a PQC back channel such as a PQC out-of-band communications channel). In some embodiments, the first classical communications channel and the second classical communications channel may utilize different classical communications channels (e.g., different communications networks, communications lines, communications circuitry, or a combination thereof). In some embodiments, the first classical communications channel and the second classical communications channel may utilize the same classical communications circuitry (e.g., the same communications network, lines, hardware, infrastructure) but a different protocol, communications mechanism, network connector, or combination thereof. For example, the PQC system may implement the non-PQC communications channel as an in-band communications channel and the PQC communications channel as an out-of-band communications channel using the same communications infrastructure.

In one illustrative example, the electronic communication may be a SWIFT message, the first portion of an electronic communication may comprise SWIFT message overhead data, and the second portion of an electronic communication may comprise SWIFT message payload data. In another illustrative example, the first portion of the electronic communication may comprise a cryptographic data attribute indicative of a symmetric cryptographic technique, and the second portion of the electronic communication may comprise a symmetric cryptographic key, such as an AES symmetric cryptographic key. The PQC system may be configured to authenticate a session (e.g., perform a cryptographic handshake) with the client device over the non-PQC communications channel based on the symmetric cryptographic key that was transmitted to the client device, or a PQC add-on device coupled to the client device, over the PQC communications channel.

In yet another illustrative example, the first portion of the electronic communication may comprise a PQC indicator data structure that identifies the PQC communications channel and indicates that a second portion of the electronic communication is to be transmitted over a PQC communications channel. The PQC indicator data structure may comprise a link or pointer to the PQC communications channel, a header that identifies the PQC communications channel as being out-of-band, other identification and routing information, or a combination thereof. In some embodiments, the PQC indicator data structure may comprise a link to the second portion of the electronic communication. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a PQC flag value. In another example, the PQC indicator data structure may comprise a link to a PQC electronic agreement (e.g., a bilateral agreement between the PQC system and the client device to exchange confidential or sensitive data over a PQC communications channel) comprising the PQC indicator data structure.

In some embodiments, the PQC indicator data structure may comprise a link to a PQC shim configured to allow communication with the PQC system (e.g., via PQC callback circuitry comprised by the PQC system) over the PQC communications channel. For example, the PQC indicator data structure may further comprise a PQC shim automatic installation control signal indicative of an electronic instruction for the client device to automatically install the PQC shim based on the link. In another example, the PQC indicator data structure may further comprise a PQC shim manual installation control signal indicative of an electronic instruction for the client device to manually install the PQC shim based on the link. In another example, the first portion of the electronic communication may comprise a PQC smart contract comprising the PQC indicator data structure.

In some embodiments, the first portion of the electronic communication may comprise a PQC request data structure (e.g., a request for an acknowledgment or confirmation that the client device is configured to communicate over a PQC communications channel). The PQC system may be configured to receive, in response to transmission of the PQC request data structure, a PQC acknowledgement data structure (e.g., an acknowledgment or confirmation that the client device is configured to communicate over a PQC communications channel) from the client device over the non-PQC communications channel. In response to receipt of the PQC acknowledgement data structure, to transmit the second portion of the electronic communication to the client device over the PQC communications channel.

In some embodiments, PQC indicator data structure may further identify a quantum communications channel and indicate that a quantum cryptographic key is to be transmitted over the quantum communications channel. The PQC indicator data structure may comprise a link or pointer to the quantum communications channel, a header that identifies the quantum communications channel and comprises other identification and routing information. In some embodiments, the PQC indicator data structure may comprise a link to the quantum cryptographic key. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a quantum flag value. In another example, the PQC indicator data structure may comprise a link to a quantum electronic agreement (e.g., a bilateral agreement between the PQC system and the client device to exchange quantum information over the quantum communications channel) comprising the PQC indicator data structure.

In some embodiments, the first portion of the electronic communication may comprise a quantum request data structure (e.g., a request for an acknowledgment or confirmation that the client device is configured to communicate over a quantum communications channel). The PQC system may be configured to receive, in response to transmission of the quantum request data structure, a quantum acknowledgement data structure (e.g., an acknowledgment or confirmation that the client device is configured to communicate over a quantum communications channel) from the client device over the non-PQC communications channel. In response to receipt of the quantum acknowledgement data structure, the PQC system may be configured to transmit the quantum cryptographic key to the client device over the quantum communications channel. Subsequently, the PQC system may be configured to authenticate a session (e.g., perform a cryptographic handshake) with the client device over the non-PQC communications channel based on the quantum cryptographic key that was transmitted to the client device over the quantum communications channel.

It is to be understood that each PQC technique may be implemented as a variant of a PQC cryptographic algorithm (e.g., based on NIST security level). For example, the libOQS implementation of Dilithium includes the variants Dilithium II (e.g., Dilithium_II_Medium), Dilithium III (e.g., Dilithium_III_Recommended), and Dilithium IV (e.g., Dilithium_IV_VeryHigh); and the ISARA Radiate Toolkit implementation of Dilithium includes the variants Dilithium 128 and Dilithium 160. Accordingly, the PQC technique for the PQC cryptographic algorithm "Dilithium" may be Dilithium II, Dilithium III, Dilithium IV, Dilithium 128, or Dilithium 160. In yet another example, the ISARA Radiate Toolkit implementation of FrodoKEM includes the variants FrodoKEM-976-AES and FrodoKEM-976-CSHAKE. In yet another example, the ISARA Radiate Toolkit speed-optimized implementation of NewHope includes the variant Lattice-based Unique Key Exchange (LUKE).

In some embodiments, the present disclosure relates to storage of data by an external data repository in a manner that is resistant and/or secure against cryptanalytic algorithms implemented on a quantum computer. In various embodiments, the present disclosure relates to a blockchain and side chain system in which a first side chain stores signed and encrypted and/or verified data from blocks of the blockchain and a second side chain stores signed and encrypted and/or verified from block of the blockchain and/or first side chain blocks from the first side chain. For example, the first side chain may use classical (e.g., non-PQC) encryption techniques and/or signatures and the second side chain may use PQC techniques and/or signatures. In various embodiments, PQC techniques are utilized so as to mitigate vulnerabilities from quantum computers using Shor's algorithm, identification of techniques to reduce the attack surface of cryptographic operations, and solutions to other cascading opportunities and challenges identified herein that stem from the vulnerability of today's common public-key encryption techniques to quantum computing.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "post-quantum cryptography (PQC)" refers to cryptosystems which are, or are considered to be, resistant to cryptanalytic algorithms implemented on a quantum computer. In some instances, the term PQC refers to cryptography that may or will be secure even after the development of large-scale error tolerant quantum computing devices. The related term "PQC migration" refers to the migration of classical cryptosystems to PQC cryptosystems and includes, but is not limited to, the updating of system software stacks and security infrastructure. In some embodiments, PQC migration includes migration of classical systems to PQC systems or hybrid systems (e.g., a combination of classical and PQC). In some embodiments, PQC migration includes translations of networks. For example, today networks A, B, and C may only be able to utilize classic cryptography, but tomorrow network C may be able to utilize PQC so the PQC system may drop in a PQC gateway to translate back and forth such that eventually network B is PQC enabled, but network A may never become PQC enabled so the PQC system may determine that transactions to or from network A are a higher risk and implement the PQC techniques described herein according to that higher risk.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state |35 degrees. The "circular basis" refers to the pair of circular photonic polarization states comprising the left circular photon polarization state |L> and the right circular photon polarization state |R>.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state |1> and the spin down state |0>); the energy level of a single atom (e.g., a superconducting qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a charge qubit (e.g., a superconducting charge qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

The term "security shelf-life" refers to the duration of time (e.g., in years) that cryptographic keys should be kept secure based on various security requirements. These security requirements include, but are not limited to, data retention requirements. For example, in some instances the security shelf life of a piece of data may be based on governmental risk and regulatory requirements.

The term "control signal" refers to an electronic alert, notification, flag, or control signal configured to instruct, or cause, the PQC system, or a QC detection system comprised by or in communication with the PQC system, to perform an automated process or function without user interactivity. For example, control signals as described herein may comprise QC detection alert control signals, leakage alert control signals, and tampering alert control signals. In some embodiments, a QC detection alert control signal may indicate, for example, that a particular cryptographic technique (e.g., a non-PQC technique, a PQC technique, a hybrid PQC technique) used to encrypt or otherwise generate encrypted QC detection data has been compromised by quantum computing. In some embodiments, a leakage alert control signal may indicate, for example, the existence of a data leakage event associated with QC detection data stored in an internal data environment that was never transmitted outside of that internal data environment. In some embodiments, a tampering alert control signal may indicate, for example, the existence of a data tampering event associated with QC detection data, wherein the QC detection data has been altered but signed using the same digital signature. In some embodiments, the QC detection alert control signals, leakage alert control signals, tampering alert control signals, or a combination thereof may instruct, or cause, the PQC system to initiate automated analyses and processes to mitigate the quantum computing threat within a duration of time. In some instances, the PQC system may generate a control signal in accordance with the criteria discussed below with reference to Table 3.

The term "quantum computing (QC) detection data" refers to data configured to be used by the PQC system, or a QC detection system comprised by or in communication with the PQC system, to detect the existence and capabilities of quantum computing and, in some instances, the strength of that quantum computing. In some instances, the PQC system may comprise fictitious data, such as fictitious account data, a fictitious code-signing certificate, any other suitable data, or any combination thereof. For example, the QC detection data may comprise fictitious financial account data, a fictitious electronic mortgage document, a fictitious electronic deed, a fictitious electronic loan document (e.g., a fictitious auto loan document, a fictitious personal loan document), a fictitious electronic stock transfer agreement, fictitious identity information, fictitious medical data, fictitious credit card data, any other suitable data, or any combination thereof. The fictitious identity information may comprise, for example, a fictitious name, address, phone number, email address, social security number, driver license number, any other suitable information, or a combination thereof. The fictitious credit card data may comprise, for example, a fictitious credit card number, credit card issuer (e.g., financial institution), cardholder name, cardholder billing address, expiration date, CVV security code, credit card network (e.g., Visa, MasterCard, American Express), EMV (originally Europay, Mastercard, and Visa) chip data, magnetic stripe data, etc.), any other suitable information, or a combination thereof. In another example, the QC detection data may comprise a fictitious code-signing certificate, a fictitious email certificate, a fictitious legally binding electronic signature certificate that represents the digital identity of a signer (e.g., a digital identification (ID) certificate, such as an X.509 certificate), any other suitable information, or a combination thereof.

The term "data environment" refers to internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, content delivery networks (CDNs), cloud service platforms, social media platforms, dark websites, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, or any combination thereof.

The term "non-PQC technique" refers to a cryptographic technique that is not resistant to cryptanalytic algorithms implemented on a quantum computer. The terms non-PQC technique, classical cryptographic technique, and modern cryptographic technique are used interchangeably herein. Non-PQC techniques may comprise, for example, RSA, DH, and other such non-PQC cryptographic algorithms. In some instances, a non-PQC technique may be a variant of a non-PQC cryptographic algorithm. For example, a first non-PQC technique may be RSA-2048, a second non-PQC technique may be RSA-3072, and a third non-PQC technique may be RSA-4096, each of which is a different variant of the same non-PQC cryptographic algorithm (e.g., RSA). In another example, a first non-PQC technique may be AES-128, and a second non-PQC technique may be DH-2048, each of which is a variant of a different non-PQC cryptographic algorithm (e.g., AES, DH). In yet another example, a first non-PQC technique may encrypt overhead data based on RSA-2048 and transmit the encrypted data over a non-PQC communications channel (e.g., an in-band communications channel), and a second non-PQC technique may transmit overhead data over a non-PQC communications channel as clear text, each of which is a different variant of a non-PQC communications channel-based cryptographic technique.

The term "PQC technique" refers to a cryptographic technique that is resistant to cryptanalytic algorithms implemented on a quantum computer. Generally, the families of PQC techniques include key management and signature. PQC techniques may comprise, for example, hash-based PQC techniques, lattice-based PQC techniques, isogeny-based PQC techniques, code-based PQC techniques, multivariate-based PQC techniques, zero-knowledge proof PQC techniques, PQC communications channel-based cryptographic techniques, and other suitable techniques. In some instances, a PQC technique may be a variant of a PQC cryptographic algorithm. For example, a first PQC technique may be Dilithium II, a second PQC technique may be Dilithium II, and a third PQC technique may be Dilithium 128, each of which is a different variant of the same PQC cryptographic algorithm (e.g., Dilithium). In another example, a first PQC technique may be LUKE, and a second PQC technique may be Dilithium II, each of which is a variant of a different PQC cryptographic algorithm (e.g., NewHope, Dilithium). In yet another example, a first PQC technique may encrypt payload data based on Dilithium II and transmit the encrypted data over a PQC communications channel (e.g., a PQC back channel), and a second PQC technique may generate a secret key that is used to encrypt payload data based on AES-256 and transmit the encrypted data over a PQC communications channel, each of which is a different variant of a PQC communications channel-based cryptographic technique.

The term "hybrid PQC technique" refers to a cryptographic technique that comprises a non-PQC technique and a PQC technique. For example, a hybrid PQC technique may comprise a PQC technique and non-PQC technique coexisting in a data envelope, as defined by the statement "hybrid PQC technique={PQC technique, Non-PQC technique}." In some embodiments, a hybrid PQC technique may comprise a hybrid PQC cryptographic mode, such as a signature-based hybrid PQC cryptographic mode consisting of a non-PQC cryptographic signature and a PQC cryptographic signature. In some embodiments, the hybrid PQC cryptographic mode is valid only if both the non-PQC cryptographic signature and the PQC cryptographic signature are valid. For example, the PQC system may (i) validate the non-PQC cryptographic signature according to the Federal Information Processing Standard (FIPS) publication 140 (e.g., 140-1, 140-2, 140-3); and (ii) validate the PQC cryptographic signature using multiple public-key algorithms for X.509 certificates, such as quantum-resistant X.509 Multiple Public Key Algorithm Certificates.

The term "quantum cryptographic technique" refers to a quantum particle-based cryptographic technique. Quantum cryptographic techniques may comprise, for example, quantum key distribution (QKD) techniques, quantum coin flipping protocols, quantum commitment protocols, quantum oblivious transfer protocols, and other suitable techniques. In some instances, a quantum cryptographic technique may be a variant of a quantum cryptographic algorithm. For example, a first quantum cryptographic technique may be a BB84-based QKD technique, a second quantum cryptographic technique may be an E91-based QKD technique, and a third quantum cryptographic technique may be a KMB09-based QKD technique, each of which is a different variant of the same quantum cryptographic algorithm (e.g., QKD).

The term "non-PQC communications channel" refers to a communications channel (e.g., a wired or wireless communications channel) over which non-quantum data and signals are exchanged using one or more non-PQC techniques that do not themselves directly rely on quantum properties. For example, the PQC system described herein may implement a non-PQC communications channel by encrypting data based on a non-PQC technique (e.g., RSA) and then transmitting the encrypted data over a non-PQC communications channel (e.g., an "in-band" communications channel) or, in some instances, by transmitting unencrypted, clear text data over the non-PQC communications channel. In some embodiments, a non-PQC communications channel may be a classical communications channel derived from a shared secret that is derived using a non-PQC technique, such as a shared secret generated using DH.

The term "PQC communications channel" refers to a communications channel (e.g., a wired or wireless communications channel) over which non-quantum data and signals are exchanged using one or more PQC techniques (e.g., for authentication, encryption, or both) that do not themselves directly rely on quantum properties. For example, the PQC system described herein may implement a PQC communications channel by encrypting data based on a PQC technique (e.g., Dilithium II) and then transmitting the encrypted data over a classical back channel (e.g., an "out-of-band" communications channel). In some embodiments, a PQC communications channel may be based on an underlying Key Encapsulation Mechanism or Key Agreement Scheme. In some embodiments, a PQC communications channel may use a Key Encapsulation Mechanism (e.g., SIKE, NTRUPrime, Kyber) to encapsulate a shared secret and ensure its safe transmission between Alice and Bob. This shared secret subsequently will either (i) be used as a Symmetric Key (e.g., for Symmetric Key encryption) or (ii) be handed over to a Key Derivation Function to generate a shared encryption key. In some embodiments, a PQC communications channel may use a Key Agreement Scheme (e.g., SIDH, NewHopeDH) may allow both Alice and Bob to calculate the shared secret based on public parameters and public key that they exchange. Unlike Key Encapsulation Mechanisms, Key Agreement Schemes do not encapsulate the calculated shared secret with ciphertext. Key Agreement Schemes may be extended to generate Ephemeral keys. In some instances, after the shared secret is calculated, the keys are destroyed to preserve perfect forward secrecy. In some embodiments, a PQC communications channel may be a classical communications channel derived from a shared secret that is derived using a Key Encapsulation Mechanism or a Key Agreement Scheme.

The term "quantum communications channel" refers to a quantum communications channel (e.g., an optical line, a quantum line) over which quantum data and particles, such as qubits, are exchanged using one or more quantum cryptographic techniques (e.g., QKD) that directly rely on quantum properties, such as quantum uncertainty, quantum entanglement, or both.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more networked devices, such as one or more servers, remote servers, cloud-based servers (e.g., cloud utilities), or other network entities, and configured to communicate with one or more devices, such as one or more server devices, client devices, database server devices, remote server devices, external data repositories, other suitable devices, or a combination thereof.

In some instances, the method, system, apparatus, and computer program product of an example embodiment may be embodied by one or more quantum communications circuitries, such as one or more quantum particle encoders, quantum particle decoders, laser devices, quantum lines, quantum particle storage devices, other suitable quantum communications devices or components, or a combination thereof.

Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), point of sale terminal (POS), electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide various PQC operations. As illustrated, a PQC system 102 may be connected to one or more PQC server devices 104 in communication with one or more PQC databases 106. The PQC system 102 may be connected to one or more server devices 110A-110N, one or more client devices 112A-112N, one or more database server devices 114, one or more remote server devices 116, and/or one or more external data repositories 120 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the PQC system 102 may be configured to provide PQC and monitor changes therein as described in further detail below.

The PQC system 102 may be embodied as one or more specialized circuitries, computers, or computing systems and may comprise one or more PQC server devices 104 and one or more PQC databases 106. The one or more PQC server devices 104 may be embodied as one or more servers, remote servers, cloud-based servers (e.g., cloud utilities), processors, any other suitable server devices, or any combination thereof. The one or more PQC server devices 104 may be configured to receive, process, generate, and transmit data, signals, and electronic information to facilitate the operations of the PQC system 102. The one or more PQC databases 106 may be embodied as one or more data storage devices, such as Network Attached Storage (NAS) devices or separate databases or servers. The one or more PQC databases 106 may be configured to store and provide access to data and information used by the PQC system 102 to facilitate the operations of the PQC system 102. For example, the one or more PQC databases 106 may store user account credentials for users of one or more server devices 110A-110N, one or more client devices 112A-112N, one or more database server devices 114, one or more remote server devices 116, or a combination thereof. In another example, the one or more PQC databases 106 may store data regarding device characteristics for the one or more server devices 110A-110N, one or more client devices 112A-112N, one or more database server devices 114, one or more remote server devices 116, or a combination thereof. In various embodiments, one or more PQC systems 102, one or more PQC server devices 104, one or more PQC databases 106, one or more server devices 112A-112N, one or more client devices 112A-112N may be configured and/or programmed to generate blockchains and corresponding side chains; provide blockchains and corresponding side chains for storage by an external data repository 120, and/or the like.

In some embodiments, the one or more PQC server devices 104, the one or more PQC databases 106, or both may include or store various data and electronic information associated with one or more data, data attributes, data envelopes, enveloped data structures, policy information, policy attributes, risk profile data structures, QC detection data, QC detection techniques (including, but not limited to, detection of quantum computing capabilities; data leakage detection techniques; and data tampering detection techniques), QC detection alert control signals, non-PQC techniques, non-PQC cryptographic performance information, non-PQC attributes, PQC performance information, PQC techniques, PQC attributes, symmetric cryptographic keys, asymmetric cryptographic keys, machine learning techniques, graphical user interface (GUI) data, any other suitable data or electronic information, any links or pointers thereto, or combinations thereof. In some embodiments, the one or more PQC server devices 104, the one or more PQC databases 106, or both may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. In some embodiments, the one or more server devices 110A-110N may receive, process, generate, and transmit data, signals, and electronic information to facilitate the operations of the PQC system 102. Information received by the PQC system 102 from one or more server devices 110A-110N may be provided in various forms and via various methods. In some embodiments, the one or more server devices 110A-110N may include or store various data and electronic information associated with one or more data, data attributes, data envelopes, enveloped data structures, policy information, policy attributes, risk profile data structures, QC detection data, QC detection techniques, QC detection alert control signals, non-PQC techniques, non-PQC cryptographic performance information, non-PQC attributes, PQC performance information, PQC techniques, PQC attributes, symmetric cryptographic keys, asymmetric cryptographic keys, machine learning techniques, GUI data, any other suitable data or electronic information, any links or pointers thereto, or combinations thereof. In some embodiments, the one or more server devices 110A-110N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more client devices 112A-112N may be embodied by one or more computing devices. Information received by the PQC system 102 from the one or more client devices 112A-112N may be provided in various forms and via various methods. For example, the one or more client devices 112A-112N may be smartphones, laptop computers, netbooks, tablet computers, wearable devices, desktop computers, automated teller machines (ATMs), point-of-sale terminals (POS), electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information), any other suitable data, or any combination thereof. In some embodiments, the one or more client devices 112A-112N may include or store various data and electronic information associated with one or more data, data attributes, data envelopes, enveloped data structures, policy information, policy attributes, risk profile data structures, QC detection data, QC detection techniques, QC detection alert control signals, non-PQC techniques, non-PQC performance information, non-PQC attributes, PQC performance information, PQC techniques, PQC attributes, symmetric cryptographic keys, asymmetric cryptographic keys, machine learning techniques, GUI data, any other suitable data or electronic information, any links or pointers thereto, or combinations thereof. In some embodiments, the one or more client devices 112A-112N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In embodiments where a client device 112 is a mobile device, such as a smartphone or tablet, the mobile device may execute an "app" (e.g., a thin-client application) to interact with the PQC system 102, one or more server devices 110A-110N, one or more database server devices 114, one or more remote server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices). Communication with hardware and software modules executing outside of the app is typically provided via APIs provided by the mobile device operating system.

The one or more database server devices 114 may be embodied by one or more computing devices, server devices, servers, data storage devices, databases, or a combination thereof. In some embodiments, the one or more database server devices 114 may be embodied as one or more data storage devices, such as one or more NAS devices, or as one or more separate databases or database servers. In some embodiments, the one or more database server devices 114 may be embodied as one or more servers, remote servers, cloud-based servers (e.g., cloud utilities), processors, or any other suitable devices, or any combination thereof. In some embodiments, the one or more database server devices 114 may receive, process, generate, and transmit data, signals, and electronic information to facilitate the operations of the PQC system 102. Information received by the PQC system 102 from one or more database server devices 114 may be provided in various forms and via various methods. It will be understood, however, that in some embodiments, the one or more database server devices 114 need not themselves be databases or database servers but may be peripheral devices communicatively coupled to databases or database servers.

In some embodiments, the one or more database server devices 114 may include or store various data and electronic information associated with one or more data, data attributes, data envelopes, enveloped data structures, policy information, policy attributes, risk profile data structures, QC detection data, QC detection techniques, QC detection alert control signals, non-PQC techniques, non-PQC performance information, non-PQC attributes, PQC performance information, PQC techniques, PQC attributes, symmetric cryptographic keys, asymmetric cryptographic keys, machine learning techniques, GUI data, any other suitable data or electronic information, any links or pointers thereto, or combinations thereof. In some embodiments, the one or more database server devices 114 may include or store exogenous data. The exogenous data may comprise, for example, public sentiment data structures (e.g., a widespread data breach at a third-party system, such as a merchant; a stock market crash; a geopolitical event), news articles, FDIC data, NIST data, company intranet data, technological advancements, scientific publications, financial data (e.g., stock market data, commodity market data, money market data), legal data (e.g., lawsuit data, regulatory data), any other suitable exogenous data, or any combination thereof. In some embodiments, the one or more database server devices 114 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more remote server devices 116 may be embodied by one or more computing devices, server devices, servers, data storage devices, databases, or a combination thereof. In some embodiments, the one or more remote server devices 116 may be embodied as one or more data storage devices, such as one or more NAS devices, or as one or more separate databases or database servers. In some embodiments, the one or more remote server devices 116 may be embodied as one or more servers, remote servers, cloud-based servers (e.g., cloud utilities), processors, or any other suitable devices, or any combination thereof. In some embodiments, the one or more remote server devices 116 may receive, process, generate, and transmit data, signals, and electronic information to facilitate the operations of the PQC system 102. Information received by the PQC system 102 from one or more remote server devices 116 may be provided in various forms and via various methods. It will be understood, however, that in some embodiments, the one or more remote server devices 116 need not themselves be servers but may be peripheral devices communicatively coupled to servers.

In some embodiments, the one or more remote server devices 116 may include or store various data and electronic information associated with one or more data, data attributes, data envelopes, enveloped data structures, policy information, policy attributes, risk profile data structures, QC detection data, QC detection techniques, QC detection alert control signals, non-PQC techniques, non-PQC performance information, non-PQC attributes, PQC performance information, PQC techniques, PQC attributes, symmetric cryptographic keys, asymmetric cryptographic keys, machine learning techniques, GUI data, exogenous data, any other suitable data or electronic information, any links or pointers thereto, or combinations thereof. In some embodiments, the one or more remote server devices 116 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more external database repositories 120 may be embodied by one or more computing devices, server devices, servers, data storage devices, databases, or a combination thereof. In various embodiments, an external data repository 120 is operated by and/or on behalf of a different entity that the PQC system 102. For example, the external data repository 120 may be Cloud-based storage system and/or other third party storage system. In some embodiments, the one or more external database repositories 120 may be embodied as one or more data storage devices, such as one or more NAS devices, or as one or more separate databases or database servers. In some embodiments, the one or more external database repositories 120 may be embodied as one or more servers, remote servers, cloud-based servers (e.g., cloud utilities), processors, or any other suitable devices, or any combination thereof. In some embodiments, the one or more external database repositories 120 may receive, process, generate, and transmit data, signals, and electronic information to facilitate the operations of the PQC system 102. Information received by the PQC system 102 from one or more external database repositories 120 may be provided in various forms and via various methods. It will be understood, however, that in some embodiments, the one or more external database repositories 120 need not themselves be databases or database servers but may be peripheral devices communicatively coupled to databases or database servers.

In some embodiments, the one or more external database repositories 120 may include or store various data and electronic information associated with one or more data, data attributes, data envelopes, enveloped data structures, policy information, policy attributes, risk profile data structures, QC detection data, QC detection techniques, QC detection alert control signals, non-PQC techniques, non-PQC performance information, non-PQC attributes, PQC performance information, PQC techniques, PQC attributes, symmetric cryptographic keys, asymmetric cryptographic keys, machine learning techniques, GUI data, blockchains and corresponding side chains, any other suitable data or electronic information, any links or pointers thereto, or combinations thereof.

In some embodiments, the one or more server devices 110A-110N, the one or more client devices 112A-112N, the one or more database server devices 114, the one or more remote server devices 116, the one or more external data repositories 120, or any combination thereof may interact with the PQC system 102 (and/or one another) over one or more communications networks 108. As yet another example, the one or more server devices 110A-110N, the one or more client devices 112A-112N, the one or more database server devices 114, the one or more remote server devices 116, the one or more external data repositories or a combination thereof may include various hardware or firmware designed to interface with the PQC system 102. For example, an example server device 110A may be a session authentication server modified to communicate with the PQC system 102, and another example server device 110B may be a purpose-built session authentication server offered for the primary purpose of communicating with the PQC system 102. As another example, an example client device 112A may be a user's smartphone and may have an application stored thereon facilitating communication with the PQC system 102, whereas another example client device 112B may be a purpose-built device offered for the primary purpose of communicating with the PQC system 102.

In some embodiments, the one or more server devices 110A-110N, the one or more client devices 112A-112N, the one or more database server devices 114, the one or more remote server devices 116, the one or more external data repositories 120, or any combination thereof may interact with the PQC system 102 over one or more PQC communications channels. The PQC communications channel may be, for example, a communications channel over which data is transmitted and received using a PQC technique, such as a PQC back channel (e.g., a PQC out-of-band communications channel). In some embodiments, the PQC system 102 may upgrade the application software in a server device 110, client device 112, database server device 114, or remote server device 116 so that the upgraded application software is configured to recognize a PQC communications channel and allow communication with the PQC system 102 over the PQC communications channel. In some embodiments, where a server device 110, client device 112, database server device 114, or remote server device 116 is a non-PQC device (e.g., a computing device that is not configured to interact with, or capable of interacting with, the PQC system 102 over a PQC communications channel), that non-PQC device may interact with the PQC system 102 over a PQC communications channel using a PQC shim or PQC add-on device configured to allow communication with the PQC system 102 over the PQC communications channel. In one example, the PQC system 102 may determine that a server device 110, client device 112, database server device 114, or remote server device 116 is a non-PQC device and transmit a PQC shim to that non-PQC device for installation (e.g., automatic installation, manual installation) in the protocol stack of that device. The PQC shim may be embodied as, for example, computer program instructions (e.g., software, firmware). In another example where the server device 110, client device 112, database server device 114, or remote server device 116 is a non-PQC device, a PQC add-on device may be communicatively coupled to the non-PQC device. The PQC add-on device may be embodied as, for example, a PQC peripheral device communicatively coupled (e.g., via a wired communications path, wireless communications path, or both) to the non-PQC device. Additionally, or alternatively, the PQC add-on device may be embodied as, for example, a PQC application specific integrated circuit (ASIC) installed within a housing of the non-PQC device, or any other suitable device or circuitry. In some embodiments, the PQC shim may comprise a set of routines with network capability and a PQC endpoint.

Example Implementing Apparatuses

The PQC system 102 described with reference to FIG. 1 may be embodied by one or more computing systems, such as apparatus 200 shown in FIG. 2A, apparatus 280 shown in FIG. 2B, and apparatus 290 shown in FIG. 2C. In some embodiments, apparatus 200 shown in FIG. 2A may represent an example PQC system 102, a PQC server device 104, a PQC database, or a combination thereof. In some embodiments, apparatus 280 shown in FIG. 2B may represent an example server device 110, client device 112, database server device 114, remote server device 116, any other suitable device, or a combination thereof. In some embodiments, apparatus 290 shown in FIG. 2C may represent an example PQC add-on device configured to be communicatively coupled to a server device 110, client device 112, database server device 114, remote server device 116, any other suitable device, or a combination thereof.

Figure 2A:
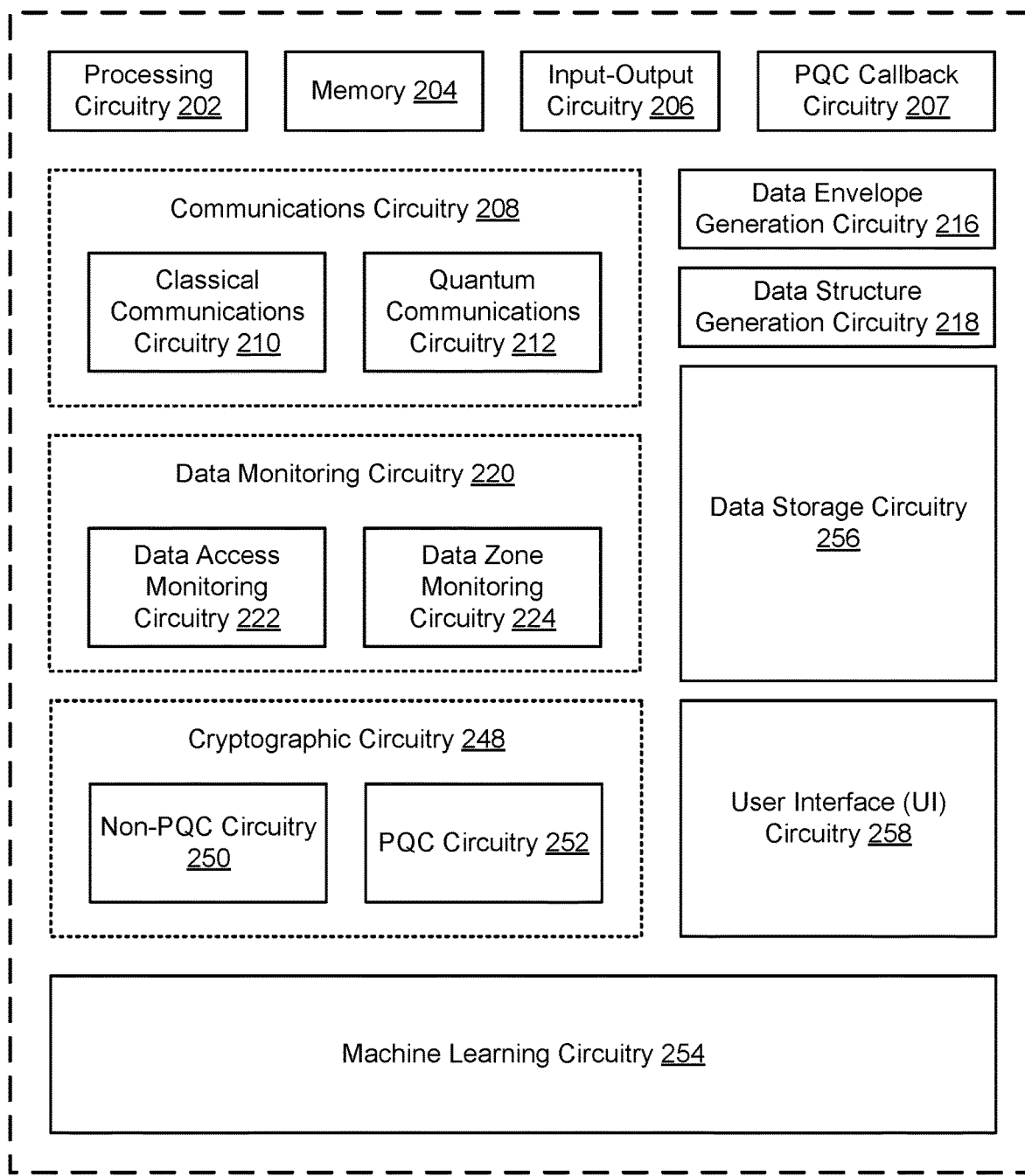
FIGS. 2A, 2B, and 2C illustrate schematic block diagrams of example circuitries that may perform various operations, in accordance with some example embodiments described herein.

FIG. 2A illustrates an example apparatus 200 that may be and/or be part of a PQC system 102 in an example embodiment. As illustrated in FIG. 2A, the apparatus 200 may include one or more of processing circuitry 202, memory 204, input-output circuitry 206, PQC callback circuitry 207, communications circuitry 208 (including, but not limited to, classical communications circuitry 210 and quantum communications circuitry 212), data envelope generation circuitry 216, data structure generation circuitry 218, data monitoring circuitry 220 (including, but not limited to, data access monitoring circuitry 222 and data zone monitoring circuitry 224), cryptographic circuitry 248 (including, but not limited to, non-PQC cryptographic circuitry 250 and PQC cryptographic circuitry 252), machine learning circuitry 254, data storage circuitry 256, user interface (UI) circuitry 258, any other suitable circuitry, or any combination thereof. The apparatus 200 may be configured to execute the operations described above with respect to FIG. 1 and below with respect to FIGS. 4-6C.

In some embodiments, the processing circuitry 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. For example, the memory may be an electronic storage device (e.g., a computer readable storage medium). The memory 204 may be configured to store information, data, data structures, content, control signals, applications, instructions, or the like, for enabling the apparatus to carry out various functions in accordance with example embodiments of the present disclosure. In some instances, the memory 204 may be configured to store data, data structures, data elements, and electronic information associated with one or more data (e.g., unencrypted data, encrypted data, decrypted data, re-encrypted data, double encrypted data, data access control information, bitstreams of data, QC detection data, links or pointers thereto), data attributes, data envelopes, enveloped data structures, policy information, policy attributes, risk profile data structures, QC detection techniques (including, but not limited to, detection of quantum computing capabilities; data leakage detection techniques; and data tampering detection techniques), control signals (e.g., QC detection alert control signals), non-PQC techniques, non-PQC performance information, non-PQC attributes, PQC performance information, PQC techniques, PQC attributes, symmetric cryptographic keys, asymmetric cryptographic keys, any other suitable data or electronic information, or combinations thereof. It will be understood that the memory 204 may be configured to store any data, data structures, electronic information, requests, control signals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processor. Alternatively, or additionally, the processing circuitry 202 may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionalities and operations described herein when the instructions are executed. For example, the processing circuitry 202 may be configured to execute instructions stored in the memory 204 or otherwise accessible to the processing circuitry, possibly in cooperation with various other circuitry, to generate a blockchain and corresponding side chains, provide a blockchain and corresponding side chains for storage by an external data repository 120, provide information/data to be included in a blockchain and/or corresponding side chains by an external data repository 120, or a combination thereof.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry included in the apparatus 200) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may be configured to generate (e.g., by UI circuitry 258) user interface data (e.g., data attribute GUI data, risk profile GUI data, PQC optimization GUI data, data monitoring GUI data) for display by one or more other devices with which one or more users directly interact and transmit the generated user interface data to one or more of those devices.

In some embodiments, the apparatus 200 may include PQC callback circuitry 207 that includes hardware components designed or configured to provide for communication with: the PQC cryptographic circuitry (e.g., PQC cryptographic circuitry 252 shown in FIG. 2B) of a client device (e.g., apparatus 280 shown in FIG. 2B, wherein the apparatus 280 does not include the PQC shim circuitry 260); a PQC shim (e.g., PQC shim circuitry 260 shown in FIG. 2B) installed in a network layer of a client device (e.g., apparatus 280 shown in FIG. 2B, wherein the apparatus 280 includes the PQC shim circuitry 260, and wherein the PQC shim circuitry 260 comprises the PQC cryptographic circuitry 252); a PQC add-on device (e.g., the apparatus 290 shown in FIG. 2C) communicatively coupled to a client device (e.g., apparatus 280 shown in FIG. 2B, wherein the apparatus 280 does not include the PQC cryptographic circuitry 252 or the PQC shim circuitry 260); any other suitable circuitry or device; or any combination thereof. For example, PQC callback circuitry 207 may be configured to provide PQC communications channel-based cryptographic techniques, such as the transmission and receipt of sensitive portions (e.g., payloads) of electronic communications to a PQC shim or a PQC add-on device over one or more PQC communications channels.

In some embodiments, the PQC callback circuitry 207 may be configured to establish a non-PQC communications channel based on one or more non-PQC cryptographic algorithms (e.g., as provided by non-PQC cryptographic circuitry 250). In some embodiments, the PQC callback circuitry 207 may be configured to establish a PQC communications channel based on one or more PQC cryptographic algorithms (e.g., as provided by PQC cryptographic circuitry 252). In some embodiments, the PQC callback circuitry 207 may be configured to establish a hybrid PQC communications channel based on one or more hybrid PQC cryptographic algorithms (e.g., as provided by cryptographic circuitry 248, such as provided by a combination of non-PQC cryptographic circuitry 250 and PQC cryptographic circuitry 252).

In one illustrative example, the PQC callback circuitry 207 may be configured to establish a PQC communications channel using a PQC cryptographic algorithm. The cryptographic circuitry 248 may be further configured to generate a secret key (e.g., an AES symmetric cryptographic key). Thereafter, the PQC callback circuitry 207 may transmit the secret key to a remote device (e.g., apparatus 280, apparatus 290) over the PQC communications channel for use in the subsequent exchange of encrypted communications.

In some embodiments, the PQC callback circuitry 207 may be configured to generate (e.g., dynamically generate) the PQC communications channel based on a set of data attributes about the electronic communication, a risk profile data structure indicative of a vulnerability of the electronic communication in a PQC data environment, and PQC performance information associated with a set of PQC techniques, wherein the PQC performance information comprises a set of PQC performance attributes for each PQC technique in the set of PQC techniques. In some embodiments, the PQC callback circuitry 207 may be configured to generate the PQC communications channel based on a machine learning technique, such as a machine learning technique provided or performed by the machine learning circuitry 254.

The communications circuitry 208 may be any device or circuitry embodied in either hardware or a combination of hardware and software that is configured to receive and/or transmit classical data, quantum information, or both from or to a network and/or any other device, circuitry, or module in communication with the apparatus 200. In this regard, the communications circuitry 208 may include, for example, classical communications circuitry 210 and quantum communications circuitry 212.

The classical communications circuitry 210 may be any device or circuitry embodied in either hardware or a combination of hardware and software that is configured to receive and/or transmit data from or to a network and/or any other device, circuitry, or module in communication with the apparatus 200. In this regard, the classical communications circuitry 210 may include, for example, a network interface for enabling communications with a wired or wireless communications network. For example, the classical communications circuitry 210 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum communications circuitry 212 may be any device or circuitry embodied in either hardware or a combination of hardware and software that is configured to receive and/or transmit quantum particles, such as photons, electrons, or both from or to any other device, circuitry, or module in communication with the apparatus 200. In this regard, the quantum communications circuitry 212 may include, for example, optical components such as an optical communications interface for enabling optical communications over a quantum line. In some embodiments, the quantum communications circuitry 212 may include encoding circuitry (e.g. an on-chip encoder) to generate a set of entangled quantum particles (e.g., qubits, qutrits, qudits) and decoding circuitry (e.g., an on-chip decoder) to receive (e.g., directly or indirectly, such as via switching circuitry), store, and measure a set of entangled quantum particles. In some embodiments, the quantum communications circuitry 212 may further include quantum basis determination circuitry configured to determine the quantum bases, or sets of quantum bases, for encoding and decoding of a given set of quantum particles. In some embodiments, the quantum communications circuitry 212 may include or be communicatively coupled to one or more quantum storage devices configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

In some embodiments, the first portion of the electronic communication may comprise a PQC indicator data structure that identifies the PQC communications channel and indicates that the second portion of the electronic communication is to be transmitted over the PQC communications channel. In some embodiments, the PQC indicator data structure may comprise a link to a PQC shim configured to allow communication with the PQC callback circuitry 207 over the PQC communications channel. For example, the PQC indicator data structure may comprise a PQC shim automatic installation control signal indicative of an electronic instruction for the client device (e.g., apparatus 280 shown in FIG. 2B) to automatically install the PQC shim based on the link. In another example, the PQC indicator data structure may comprise a PQC shim manual installation control signal indicative of an electronic instruction for the client device to manually install the PQC shim based on the link. In still another example, the first portion of the electronic communication may comprise a PQC smart contract comprising the PQC indicator data structure. Once installed on the client device, the PQC shim may be implemented as PQC shim circuitry 260 shown in FIG. 2B.

In some embodiments, the communications circuitry 208 may be configured to receive, retrieve, or obtain data. In some embodiments, the data may comprise data access control information, a link or pointer to the data (e.g., a link to a credit card number), a bitstream, a binary large object (BLOB), any other suitable data, or any combination thereof. In some embodiments, the data may have been encrypted based on a set of encryption attributes, such as a set of non-PQC attributes, a set of PQC attributes, or both (e.g., double encryption where the data has been encrypted based on a set of non-PQC attributes and then encrypted again based on a set of PQC attributes). In some embodiments, the communications circuitry 208 may be configured to receive, retrieve, or obtain the data from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, the one or more external data repositories 120, any other suitable device or circuitry, or a combination thereof.

The data envelope generation circuitry 216 includes hardware components designed or configured to request, receive, process, generate, and transmit data, data structures, control signals, and electronic information for use in PQC. In some embodiments, the data envelope generation circuitry 216 may be configured to generate a data envelope based on the set of data attributes. In some embodiments, the data envelope generation circuitry 216 may be configured to generate the data envelope based on the set of data attributes. In some embodiments, the data envelope may comprise the set of data attributes. In some embodiments, the data envelope generation circuitry 216 may be configured to generate the data envelope based on the set of data attributes, a risk profile data structure, any other suitable data, or any combination thereof. In some embodiments, the data envelope may comprise the set of data attributes, a risk profile data structure, any other suitable data, or any combination thereof. In some embodiments, each piece of data may have a data envelope, wherein the data envelope comprises one or more attributes about the data. In some embodiments, the data and its envelope may be referred to as a "data BLOB." In some instances, the data envelope will keep track of who accessed the data, such as who took an encrypted snapshot of the data and when that encrypted snapshot was taken. In an example, embodiment, a data envelope generation circuitry 216 is configured to bundle an encrypted information/data instance and a corresponding decryption algorithm to generate an encryption bundle.

The data structure generation circuitry 218 includes hardware components designed or configured to request, receive, process, generate, and transmit data, data structures, control signals, and electronic information for use in PQC. In some embodiments, the data structure generation circuitry 218 may be configured to generate an enveloped data structure based on the data envelope and the data. In some embodiments, the enveloped data structure comprises the data envelope and the data. In some embodiments, the enveloped data structure comprises the data envelope (e.g., set of data attributes, risk profile data structure, any other suitable data, or any combination thereof) and the data (e.g., data access control information, link or pointer to the data, bitstream, BLOB, any other suitable data, or any combination thereof). For example, the enveloped data structure may comprise the data enveloped by the data envelope.

The data monitoring circuitry 220 includes hardware components designed or configured to request, receive, process, generate, and transmit data, data structures, control signals, and electronic information for use in PQC. In some embodiments, the data monitoring circuitry 220 may be configured to monitor data, enveloped data structures, any other suitable data or electronic information, or any combination thereof. In this regard, the data monitoring circuitry 220 may include, for example, data access monitoring circuitry 222 and data zone monitoring circuitry 224.

In some embodiments, the data monitoring circuitry 220 may be configured to monitor an enveloped data structure and identify changes in the enveloped data structure. In some embodiments, the enveloped data structure may comprise a data envelope and data. In some embodiments, the data envelope may comprise a set of data attributes about the data and a risk profile data structure indicative of a vulnerability of the data in a PQC data environment. In some embodiments, the data has been encrypted based on a set of non-PQC attributes or a set of PQC attributes. For example, the data monitoring circuitry 220 may be configured to generate an electronic indication of the change in the enveloped data structure, such as a control signal, metadata, or flag indicative of the change. In some embodiments, the data monitoring circuitry 220 may be configured to automatically monitor the enveloped data structure in real-time and without user interactivity; automatically identify the change in the enveloped data structure in real-time and without user interactivity; and generate the electronic indication of the change in the enveloped data structure in real-time and without user interactivity.

In some embodiments, the change in the enveloped data structure may be a change in the risk profile data structure, such as a change in a value of the data, a change in a longevity of the data, a change in a cryptostrength of the data, a change in a result of a vulnerability scan of the data, a change in a vulnerability score value (e.g., any value associated with a vulnerability score data structure comprising a vulnerability score range comprising a minimum vulnerability score value, a maximum vulnerability score value, a median vulnerability score value, a mean vulnerability score value, a first quartile vulnerability score value, a third quartile vulnerability score value, an interquartile vulnerability score range between the first quartile vulnerability score value and the third quartile vulnerability score value, any other suitable value, metric, or range, or any combination thereof) indicative of a percentage of vulnerability of the data in the PQC data environment, a change in a compliance score value indicative of a percentage of compliance of the data to a set of compliance requirements, a change in an approximate time to a quantum computing threat (e.g., changes in collapse time, changes in vulnerabilities to existing algorithms, receipt of a QC detection alert control signal), a change in exogenous data associated with the data, wherein the exogenous data comprises a public sentiment data structure (e.g., a widespread data breach at a third-party system, such as a merchant; a stock market crash; a geopolitical event), a change in any other suitable data, data structure, or data element, or any combination thereof. In some embodiments, the change in the enveloped data structure may be a determination that the data has been accessed and by whom (e.g., user, entity, location). In some embodiments, the change in the enveloped data structure may be a determination that the data has transitioned to a different data zone (e.g., from a first data zone to a second data zone).

In some embodiments, the data monitoring circuitry 220 may be configured to monitor a set of data environments for electronic information related to the encrypted QC detection data. For example, the data monitoring circuitry 220 may be configured to monitor a set of internal data environments (e.g., internal information systems, internal data networks, internal data storage devices) and, in some instances, flag uses of the QC detection data, the private cryptographic key used to encrypt the QC detection data, or any other suitable data that made its way into the internal data environment. In another example, the data monitoring circuitry 220 may be configured to monitor a set of external data environments (e.g., content delivery networks (CDNs), cloud service platforms, social media platforms, dark websites) and, in some instances, flag uses of the unencrypted QC detection data or any other suitable data that made its way into the external data environment.

In some embodiments, the data monitoring circuitry 220 may be further configured to generate a QC detection alert control signal in response to detection of the electronic information related to the encrypted QC detection data. For example, the data monitoring circuitry 220 may be further configured to generate a QC detection alert control signal when the detected electronic information related to the encrypted QC detection data comprises decrypted QC detection data that is the same as the QC detection data. In some embodiments, the QC detection alert control signal may indicate, for example, that the cryptographic technique used to encrypt the QC detection data has been compromised by quantum computing. In some embodiments, the QC detection alert control signal may be configured to instruct, or cause, the cryptographic circuitry 248 to encrypt or re-encrypt data (e.g., enveloped data structures stored in one or more internal or third-party data storage devices) using a PQC technique having a cryptostrength that cannot be compromised by that particular quantum computer. In some embodiments, the QC detection alert control signal may be configured to instruct, or cause, the UI circuitry 258 to generate QC detection alert GUI data (e.g., an electronic notification, e-mail, pop-up display, audible alarm) and transmit the generated QC detection alert GUI data to the input-output circuitry 206, and the input-output circuitry 206 may be configured to receive the QC detection alert GUI data and display the received QC detection alert GUI data on one or more display screens.

In some embodiments, wherein the cryptographic circuitry 248 is configured to not transmit the encrypted QC detection data, the data monitoring circuitry 220 may be configured to generate a leakage alert control signal in response to detection of the electronic information related to the encrypted QC detection data. In some embodiments, the leakage alert control signal may indicate, for example, that the QC detection data was leaked from an internal data environment, when the QC detection data was leaked from the internal data environment, who leaked the QC detection data from the internal data environment (e.g., based on the data lineage of the QC detection data), how the QC detection data was leaked from the internal data environment, any other suitable information, or any combination thereof. In some embodiments, the leakage alert control signal may be configured to instruct, or cause, the communications circuitry 208 to disallow any data to be transmitted out of the internal data environment associated with the leaked QC detection data. In some embodiments, the leakage alert control signal may be configured to instruct, or cause, the UI circuitry 258 to generate leakage alert GUI data (e.g., an electronic notification, e-mail, pop-up display, audible alarm) and transmit the generated leakage alert GUI data to the input-output circuitry 206, and the input-output circuitry 206 may be configured to receive the leakage alert GUI data and display the received leakage alert GUI data on one or more display screens.

In some embodiments, when the detected electronic information related to the encrypted QC detection data comprises a detected digital signature, the data monitoring circuitry 220 may be further configured to verify the detected digital signature based on the public cryptographic key. In some embodiments, the data monitoring circuitry 220 may be further configured to generate a tampering alert control signal when the detected electronic information related to the encrypted QC detection data further comprises detected payload data that has been digitally signed based on the detected digital signature, the detected digital signature is the same as the QC detection digital signature, and the detected payload data is different from the QC detection data.

In some embodiments, the tampering alert control signal may indicate, for example, that the QC detection data has been altered but signed using the same digital signature. For example, the encrypted QC detection data may comprise QC detection data that has been digitally signed based on a digital signature (e.g., RSA, such as RSA-PSS; DSA and its elliptic curve variant ECDSA), and the electronic information related to the encrypted QC detection data may comprise payload data that has been digitally signed based on the digital signature. In some instances, the payload data may be different from the QC detection data, such as a different fraudulent document digitally signed by the same digital signature. In some instances, a subset of the payload data may be the same as a subset of the QC detection data, such as an altered document digitally signed by the same digital signature. For example, the QC detection data may comprise a fictitious stock transfer agreement comprising a first stock transfer attribute indicative of a first amount of transferred shares (e.g., 10 transferred shares), the detected payload data may comprise a detected stock transfer agreement comprising a second stock transfer attribute indicative of a second amount of transferred shares (e.g., 10,000 transferred shares) different from the first amount of transferred shares, and the tampering alert control signal may comprise an indication that the fictitious stock transfer agreement has been tampered with. In other examples, the detected payload data may comprise different buyer or seller information on a digitally signed fictitious electronic mortgage; different owner information on a digitally signed fictitious financial account; different payee or payment amount on a digitally signed fictitious financial transaction (e.g., a fictitious wire transfer, mobile deposit, or electronic check); or any other suitable information.

In some embodiments, the tampering alert control signal may be configured to instruct, or cause, the UI circuitry 258 to generate tampering alert GUI data (e.g., an electronic notification, e-mail, pop-up display, audible alarm) and transmit the generated tampering alert GUI data to the input-output circuitry 206, and the input-output circuitry 206 may be configured to receive the tampering alert GUI data and display the received tampering alert GUI data on one or more display screens.

In some embodiments, the data monitoring circuitry 220 includes hardware components designed or configured to request, receive, process, generate, and transmit data, data structures, control signals, and electronic information for use in QC detection. In some embodiments, the data monitoring circuitry 220 may be configured to monitor QC detection data, other data, enveloped data structures, any other suitable data or electronic information, or any combination thereof.

In some embodiments, the data monitoring circuitry 220 may be configured to monitor a set of data environments for electronic information related to the encrypted QC detection data. For example, the data monitoring circuitry 220 may be configured to monitor a set of internal data environments (e.g., internal information systems, internal data networks, internal data storage devices) and, in some instances, flag uses of the QC detection data, the private cryptographic key used to encrypt the QC detection data, or any other suitable data that made its way into the internal data environment. In another example, the data monitoring circuitry 220 may be configured to monitor a set of external data environments (e.g., content delivery networks (CDNs), cloud service platforms, social media platforms, dark websites) and, in some instances, flag uses of the unencrypted QC detection data or any other suitable data that made its way into the external data environment.

In some embodiments, the data monitoring circuitry 220 may be configured to generate alerts and notifications, such as QC detection alert control signals, leakage alert control signals, and tampering alert control signals. In some embodiments, the data monitoring circuitry 220 may be configured to generate a QC detection alert control signal in response to detection of the electronic information related to the encrypted QC detection data. For example, the data monitoring circuitry 220 may be configured to generate a QC detection alert control signal when the detected electronic information related to the encrypted QC detection data comprises decrypted QC detection data that is the same as the QC detection data. In some embodiments, the QC detection alert control signal may indicate, for example, that the cryptographic technique used to encrypt the QC detection data has been compromised by quantum computing. In some embodiments, the QC detection alert control signal may be configured to instruct, or cause, the cryptographic circuitry 248 to encrypt or re-encrypt data (e.g., enveloped data structures stored in one or more internal or third-party data storage devices) using a PQC technique having a cryptostrength that cannot be compromised by that particular quantum computer. In some embodiments, the QC detection alert control signal may be configured to instruct, or cause, the UI circuitry 258 to generate QC detection alert GUI data (e.g., an electronic notification, e-mail, pop-up display, audible alarm) and transmit the generated QC detection alert GUI data to the input-output circuitry 206, and the input-output circuitry 206 may be configured to receive the QC detection alert GUI data and display the received QC detection alert GUI data on one or more display screens.

In some embodiments, the data monitoring circuitry 220 may be configured to generate a leakage alert control signal in response to detection of the electronic information related to the encrypted QC detection data. In some embodiments, the leakage alert control signal may indicate, for example, that the QC detection data was leaked from an internal data environment, when the QC detection data was leaked from the internal data environment, who leaked the QC detection data from the internal data environment (e.g., based on the data lineage of the QC detection data), how the QC detection data was leaked from the internal data environment, any other suitable information, or any combination thereof. In some embodiments, the leakage alert control signal may be configured to instruct, or cause, the communications circuitry 208 to disallow any data to be transmitted out of the internal data environment associated with the leaked QC detection data. In some embodiments, the leakage alert control signal may be configured to instruct, or cause, the UI circuitry 258 to generate leakage alert GUI data (e.g., an electronic notification, e-mail, pop-up display, audible alarm) and transmit the generated leakage alert GUI data to the input-output circuitry 206, and the input-output circuitry 206 may be configured to receive the leakage alert GUI data and display the received leakage alert GUI data on one or more display screens.

In some embodiments, when the detected electronic information related to the encrypted QC detection data comprises a detected digital signature, the data monitoring circuitry 220 may be configured to verify the detected digital signature based on the public cryptographic key. In some embodiments, the data monitoring circuitry 220 may be configured to generate a tampering alert control signal when the detected electronic information related to the encrypted QC detection data further comprises detected payload data that has been digitally signed based on the detected digital signature, the detected digital signature is the same as the QC detection digital signature, and the detected payload data is different from the QC detection data.

In some embodiments, the tampering alert control signal may indicate, for example, that the QC detection data has been altered but signed using the same digital signature. For example, the encrypted QC detection data may comprise QC detection data that has been digitally signed based on a digital signature (e.g., RSA, such as RSA-PSS; DSA and its elliptic curve variant ECDSA), and the electronic information related to the encrypted QC detection data may comprise payload data that has been digitally signed based on the digital signature. In some instances, the payload data may be different from the QC detection data, such as a different fraudulent document digitally signed by the same digital signature. In some instances, a subset of the payload data may be the same as a subset of the QC detection data, such as an altered document digitally signed by the same digital signature. For example, the QC detection data may comprise a fictitious stock transfer agreement comprising a first stock transfer attribute indicative of a first amount of transferred shares (e.g., 10 transferred shares), the detected payload data may comprise a detected stock transfer agreement comprising a second stock transfer attribute indicative of a second amount of transferred shares (e.g., 10,000 transferred shares) different from the first amount of transferred shares, and the tampering alert control signal may comprise an indication that the fictitious stock transfer agreement has been tampered with. In other examples, the detected payload data may comprise different buyer or seller information on a digitally signed fictitious electronic mortgage; different owner information on a digitally signed fictitious financial account; different payee or payment amount on a digitally signed fictitious financial transaction (e.g., a fictitious wire transfer, mobile deposit, or electronic check); or any other suitable information.

In some embodiments, the tampering alert control signal may be configured to instruct, or cause, the UI circuitry 258 to generate tampering alert GUI data (e.g., an electronic notification, e-mail, pop-up display, audible alarm) and transmit the generated tampering alert GUI data to the input-output circuitry 206, and the input-output circuitry 206 may be configured to receive the tampering alert GUI data and display the received tampering alert GUI data on one or more display screens.

The data access monitoring circuitry 222 includes hardware components designed or configured to request, receive, process, generate, and transmit data, data structures, control signals, and electronic information for use in PQC. In some embodiments, the data access monitoring circuitry 222 may be configured to monitor the access of data, enveloped data structures, any other suitable data or electronic information, or any combination thereof. For example, the data access monitoring circuitry 222 may be configured to determine that the data has been accessed, generate a determination that the data has been accessed, and transmit the determination that the data has been accessed to any suitable circuitry.

In some embodiments, the data access monitoring circuitry 222 may be configured to generate a data access log indicative of a set of data activity monitoring information (e.g., database activity monitoring information, access credentials, user identification information, machine identification information) associated with electronic access to the data. For example, the data access monitoring circuitry 222 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC attributes used to encrypt the data at the time associated with the timestamp. In another example, the data access monitoring circuitry 222 may be configured to generate the set of data activity monitoring information and transmit the set of data activity monitoring information to the processing circuitry 202 and/or the like, which may be configured to receive the set of data activity monitoring information and generate a data access log based on the set of data activity monitoring information.

In some embodiments, the communications circuitry 208 may be configured to receive the data at a first time, the set of data attributes may be a first set of data attributes, the data envelope may be a first data envelope, the enveloped data structure may be a first enveloped data structure, and the data access monitoring circuitry 222 may be configured to determine that the data has been accessed at a second time later than the first time. In some embodiments, the data access monitoring circuitry 222 may be configured to generate an electronic indication, control signal, metadata, or flag indicating that the data has been accessed at the second time. In response to the determination (e.g., the electronic indication, control signal, metadata, or flag generated by the data access monitoring circuitry 222) that the data has been accessed at the second time, the processing circuitry 202 and/or other circuitry may be configured to generate a second set of data attributes about the data based on the data and the determination that the data has been accessed at the second time, the data envelope generation circuitry 216 may be configured to generate a second data envelope based on the second set of data attributes, and the data structure generation circuitry 218 may be configured to generate a second enveloped data structure based on the second data envelope and the data. For example, the first set of data attributes may comprise a first data lineage data attribute indicative of a first data lineage of the data, the second set of data attributes may comprise a second data lineage data attribute indicative of a second data lineage of the data, and the first data lineage data attribute may be different from the second data lineage data attribute.

The data zone monitoring circuitry 224 includes hardware components designed or configured to request, receive, process, generate, and transmit data, data structures, control signals, and electronic information for use in PQC. In some embodiments, the data zone monitoring circuitry 224 may be configured to monitor the data zone associated with data, enveloped data structures, any other suitable data or electronic information, or any combination thereof. For example, the data zone monitoring circuitry 224 may be configured to determine that the data has transitioned from a first data zone to a second data zone, generate a determination that the data has transitioned from the first data zone to the second data zone, and transmit the determination that the data has transitioned from the first data zone to the second data zone to any suitable circuitry.

In some embodiments, the communications circuitry 208 may be configured to receive the data at a first time, the set of data attributes may be a first set of data attributes comprising a first data zone data attribute indicative of a first data zone associated with the data, the data envelope may be a first data envelope, the enveloped data structure may be a first enveloped data structure, and the data zone monitoring circuitry 224 may be configured to determine that the data has transitioned from the first data zone to a second data zone at a second time later than the first time. In some embodiments, the data zone monitoring circuitry 224 may be configured to generate an electronic indication, control signal, metadata, or flag indicating that the data has transitioned from the first data zone to the second data zone at the second time. In response to the determination (e.g., the electronic indication, control signal, metadata, or flag generated by the data zone monitoring circuitry 224) that the data has transitioned from the first data zone to the second data zone at the second time, the processing circuitry 202 may be configured to generate a second set of data attributes about the data based on the data and the determination that the data has transitioned from the first data zone to the second data zone at the second time. The second set of data attributes may comprise a second data zone data attribute indicative of the second data zone associated with the data, and the second data zone data attribute may be different from the first data zone data attribute. The data envelope generation circuitry 216 may be configured to generate a second data envelope based on the second set of data attributes. The data structure generation circuitry 218 may be configured to generate a second enveloped data structure based on the second data envelope and the data.

In some embodiments, a first enveloped data structure may comprise data and a first data envelope comprising a set of data attributes. The data envelope generation circuitry 216 may be configured to generate a second data envelope comprising the set of data attributes and a risk profile data structure corresponding to the data. The data structure generation circuitry 218 may be configured to generate a second enveloped data structure comprising the second data envelope and the data.

The cryptographic circuitry 248 includes hardware components designed or configured to request, receive, process, generate, and transmit data, data structures, control signals, and electronic information for use in PQC. In some embodiments, the cryptographic circuitry 248 may be configured to encrypt data based on a set of PQC attributes, a set of PQC attributes, or both. In this regard, the cryptographic circuitry 248 may include, for example, non-PQC circuitry 250 and PQC circuitry 252. In some embodiments, where the first portion of the electronic communication comprises a cryptographic data attribute indicative of a symmetric cryptographic technique and the second portion of the electronic communication comprises a symmetric cryptographic key, such as an AES symmetric cryptographic key, the cryptographic circuitry 248 may be configured to authenticate a session (e.g., perform a cryptographic handshake) with the client device over the non-PQC communications channel based on the symmetric cryptographic key that was transmitted to the client device over the PQC communications channel.

In some embodiments, the cryptographic circuitry 248 may be configured to authenticate a session (e.g., perform a cryptographic handshake) with the client device over the non-PQC communications channel based on the quantum cryptographic key that was transmitted to the client device over the quantum communications channel. In some embodiments, the cryptographic circuitry 248 may be configured to encrypt the second portion of the electronic communication based on the quantum cryptographic key before transmission to the client device over the PQC communications channel.

The non-PQC cryptographic circuitry 250 includes hardware components designed or configured to request, receive, process, generate, and transmit data, data structures, control signals, and electronic information for use in PQC. In some embodiments, the non-PQC cryptographic circuitry 250 may be configured to encrypt the data based on the set of non-PQC attributes.

The PQC cryptographic circuitry 252 includes hardware components designed or configured to request, receive, process, generate, and transmit data, data structures, control signals, and electronic information for use in PQC. In some embodiments, the PQC circuitry 252 may be configured to encrypt the data based on the set of PQC attributes using a PQC technique.

In some embodiments, the communications circuitry 208 may be configured to receive the data at a first time, the set of data attributes may be a first set of data attributes comprising a first cryptographic data attribute indicative of a first cryptographic technique used to encrypt the data, the data envelope may be a first data envelope, the enveloped data structure may be a first enveloped data structure, and the PQC cryptographic circuitry 252 may be configured to encrypt the data using a second cryptographic technique at a second time later than the first time. In response to an encryption of the data using the second cryptographic technique at the second time, the processing circuitry 202 may be configured to generate a second set of data attributes about the data based on the data and the encryption of the data using the second cryptographic technique at the second time. The second set of data attributes may comprise a second cryptographic data attribute indicative of the second cryptographic technique used to encrypt the data at the second time, and the second cryptographic data attribute may be different from the first cryptographic data attribute. The data envelope generation circuitry 216 may be configured to generate a second data envelope based on the second set of data attributes. The data structure generation circuitry may be configured to generate a second enveloped data structure based on the second data envelope and the data. In one example, the first cryptographic technique may be a non-PQC technique, and the second cryptographic technique may be a PQC technique. In another example, the first cryptographic technique may be a first PQC technique, and the second cryptographic technique may be a second PQC technique different from the first PQC technique (including, but not limited to, a different variant of the same PQC cryptographic algorithm).

In some embodiments, the cryptographic circuitry 248 may be configured to encrypt data using various recommended cryptographic techniques, such as non-PQC techniques, PQC techniques, and hybrid PQC techniques (e.g., hybrid PQC technique={PQC technique, Non-PQC technique}). For example, the recommended cryptographic technique may comprise a hybrid PQC cryptographic mode, such as a signature-based hybrid PQC cryptographic mode consisting of a non-PQC cryptographic signature and a PQC cryptographic signature, where the hybrid PQC cryptographic mode is valid only if both the non-PQC cryptographic signature and the PQC cryptographic signature are valid (e.g., the PQC system may perform validation of the non-PQC cryptographic signature according to FIPS 140-3; the PQC system may perform validation of the PQC cryptographic signature using multiple public-key algorithms for X.509 certificates, such as quantum-resistant X.509 Multiple Public Key Algorithm Certificates).

In some embodiments, the cryptographic circuitry 248 may recommend different cryptographic techniques for encrypting data used by different lines of business (LOBs) or entities. For example, the cryptographic circuitry 248 may recommend a first PQC technique for encrypting data used by a first LOB; a second PQC technique for encrypting data used by a second LOB; a non-PQC technique for encrypting data used by a third LOB; and a hybrid PQC technique for encrypting data used by a fourth LOB.

The machine learning circuitry 254 includes hardware components designed or configured to request, receive, process, generate, and transmit data, data structures, control signals, and electronic information for use in PQC. In some embodiments, the machine learning circuitry 254 may be configured to provide machine learning techniques, any other suitable functionality, or any combination thereof. For example, the machine learning circuitry 254 may be configured to provide a machine learning technique, machine learning functionality, or both to the data envelope generation circuitry 216, data structure generation circuitry 218, data monitoring circuitry 220, any other circuitry, or any combination thereof. In some embodiments, the machine learning circuitry 254 may be configured to determine the machine learning technique from among a set of machine learning techniques.

In some embodiments, the machine learning circuitry 254 may be configured to provide a machine learning technique, machine learning functionality, or both to the processing circuitry 202 for use in generation of the set of data attributes about the data. In some embodiments, the machine learning circuitry 254 may be configured to provide a machine learning technique, machine learning functionality, or both to the processing circuitry 202 for use in generation of the set of policy attributes about the data.

The data storage circuitry 256 includes hardware components designed or configured to request, receive, process, generate, store, and transmit data, data structures, control signals, and electronic information for use in PQC. In some embodiments, the data storage circuitry 256 may be configured to store data (e.g., unencrypted data, encrypted data, decrypted data, re-encrypted data, double encrypted data, data access control information, bitstreams of data, links or pointers thereto), data attributes, data envelopes, enveloped data structures, policy information, policy attributes, risk profile data structures, non-PQC techniques, non-PQC performance information, non-PQC attributes, PQC performance information, PQC techniques, PQC attributes, symmetric cryptographic keys, asymmetric cryptographic keys, any other suitable data or electronic information, or combinations thereof in a data storage device, a database management system, any other suitable storage device or system, or any combination thereof.

For example, the data storage circuitry 256 may be configured to store an enveloped data structure in a data storage device, a database management system, or a combination thereof. In some embodiments, the data storage circuitry 256 may be configured to store the data, data structures, control signals, and electronic information in the data storage device, the database management system, or both in real-time and without user interactivity.

In some embodiments, the data storage device may comprise, or be implemented as, memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the database management system may comprise, or be implemented as, a database management system (DBMS), such as a relational DMBS (RDBMS) data warehouse, a first non-relational DBMS (e.g., Hadoop distributed file system (HDFS), Hbase), a second non-relational DBMS (e.g., content management systems), a data visualization device, a data mart (e.g., online analytical processing (OLAP) cube), a real-time analytical RDBMS, any other suitable device or circuitry, or a combination thereof. In some embodiments, the data storage device, the database management system, or both may comprise, or be implemented as, one or more decentralized storage devices, such as a cloud storage device or system.

The UI circuitry 258 includes hardware components designed or configured to generate graphical user interface (GUI) data configured to be displayed by a display device. For instance, the UI circuitry 258 may include hardware components designed or configured to generate GUI data based on any embodiment or combination of embodiments described with reference to FIGS. 1-6C. In some embodiments, the UI circuitry 258 may be configured to generate GUI data and transmit the generated GUI data to the input-output circuitry 206, and the input-output circuitry 206 may be configured to receive the GUI data and display the received GUI data on one or more display screens. In some embodiments, the UI circuitry 258 may include hardware components designed or configured to generate the GUI data based on one or more portions of the data; data attributes; data envelopes; enveloped data structures; policy information; policy attributes; risk profile data structures; non-PQC techniques; non-PQC performance information; non-PQC attributes; PQC performance information; PQC techniques; PQC attributes; symmetric cryptographic keys; asymmetric cryptographic keys; quantum particles; quantum cryptographic keys; quantum one-time pads; any other suitable data, data structures, electronic information, or quantum information; any links or pointers thereto; and any combinations thereof. The GUI data may comprise, for example, data attribute GUI data generated based on the set of data attributes; risk profile GUI data generated based on the risk profile data structure; PQC optimization GUI data generated based on the PQC cryptographic performance information (including, but not limited to, the set of PQC cryptographic performance attributes), the set of PQC attributes, or both; and data monitoring GUI data generated based on the monitoring of enveloped data structures, electronic indications of changes in the monitored enveloped data structures, any other suitable data, or any combination thereof.

In some embodiments, the UI circuitry 258 may be configured to generate a data attribute GUI based on the set of data attributes. In some embodiments, the UI circuitry 258 may be configured to generate a risk profile GUI data based on the risk profile data structure. In some embodiments, the UI circuitry 258 may be configured to generate a PQC optimization GUI based on the PQC performance information (including, but not limited to, the set of PQC performance attributes), the set of PQC attributes, or both. In some embodiments, the UI circuitry 258 may be configured to generate a data monitoring GUI based on the monitoring of enveloped data structures, electronic indications of changes in the monitored enveloped data structures, any other suitable data, or any combination thereof. In some embodiments, the communications circuitry 208 may be configured to transmit the data attribute GUI, risk profile GUI, PQC optimization GUI, data monitoring GUI, or a combination thereof to a client device for display by the client device.

It should also be appreciated that, in some embodiments, each of the data envelope generation circuitry 216, data structure generation circuitry 218, data monitoring circuitry 220, data access monitoring circuitry 222, data zone monitoring circuitry 224, cryptographic circuitry 248, non-PQC cryptographic circuitry 250, PQC cryptographic circuitry 252, machine learning circuitry 254, data storage circuitry 256, and UI circuitry 258 may include a separate processor, specially configured field programmable gate array (FPGA), ASIC, or cloud utility to perform the above functions.

Figure 2B:
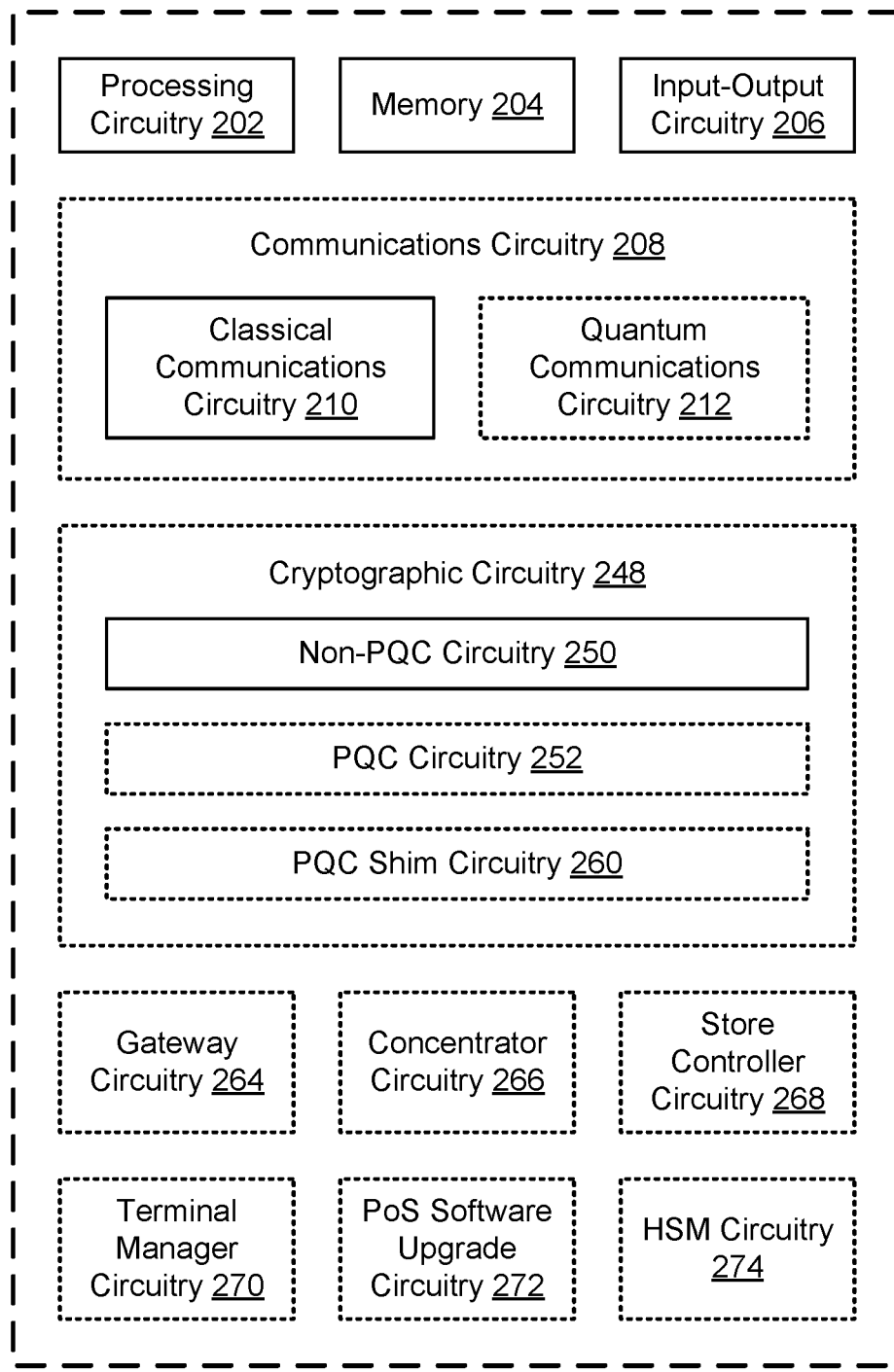

In some embodiments, the hardware components described above with reference to data envelope generation circuitry 216, data structure generation circuitry 218, data monitoring circuitry 220, data access monitoring circuitry 222, data zone monitoring circuitry 224, cryptographic circuitry 248, non-PQC cryptographic circuitry 250, PQC cryptographic circuitry 252, machine learning circuitry 254, data storage circuitry 256, and UI circuitry 258, may, for instance, utilize PQC callback circuitry 207, communications circuitry 208, or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more portions of apparatus 200 shown in FIG. 2A), the PQC shim circuitry of another apparatus (e.g., the PQC shim circuitry 260 of a separate apparatus implementing one or more portions of apparatus 280 shown in FIG. 2B), the communications circuitry of another apparatus (e.g., the communications circuitry 208 of a separate apparatus implementing one or more portions of apparatus 200, 280, or 290), each other, or any other suitable circuitry or device.

In some embodiments, one or more of the data envelope generation circuitry 216, data structure generation circuitry 218, data monitoring circuitry 220, data access monitoring circuitry 222, data zone monitoring circuitry 224, cryptographic circuitry 248, non-PQC cryptographic circuitry 250, PQC cryptographic circuitry 252, machine learning circuitry 254, data storage circuitry 256, and UI circuitry 258 may be hosted locally by the apparatus 200.

In some embodiments, one or more of the data envelope generation circuitry 216, data structure generation circuitry 218, data monitoring circuitry 220, data access monitoring circuitry 222, data zone monitoring circuitry 224, cryptographic circuitry 248, non-PQC cryptographic circuitry 250, PQC cryptographic circuitry 252, machine learning circuitry 254, data storage circuitry 256, and UI circuitry 258 may be hosted remotely (e.g., by one or more cloud servers) and thus need not physically reside on the apparatus 200. Thus, some or all of the functionality described herein may be provided by a third-party circuitry. For example, the apparatus 200 may access one or more third-party circuitries via a networked connection configured to transmit and receive data and electronic information between the apparatus 200 and the third-party circuitries. In turn, the apparatus 200 may be in remote communication with one or more of the data envelope generation circuitry 216, data structure generation circuitry 218, data monitoring circuitry 220, data access monitoring circuitry 222, data zone monitoring circuitry 224, cryptographic circuitry 248, non-PQC cryptographic circuitry 250, PQC cryptographic circuitry 252, machine learning circuitry 254, data storage circuitry 256, and UI circuitry 258.

As illustrated in FIG. 2B, an apparatus 280 is shown that represents an example server device 110, client device 112, database server device 114, remote server device 116, any other suitable device, or a combination thereof. The apparatus 280 may include one or more of processing circuitry 202, memory 204, input-output circuitry 206, communications circuitry 208 (including, but not limited to, classical communications circuitry 210 and quantum communications circuitry 212), cryptographic circuitry 248 (including, but not limited to, non-PQC cryptographic circuitry 250, PQC cryptographic circuitry 252, and, in some instances, PQC shim circuitry 260, wherein PQC shim circuitry 260 comprises PQC cryptographic circuitry 252), gateway circuitry 264, concentrator circuitry 266, store controller circuitry 268, terminal manager circuitry 270, POS software upgrade circuitry 272, hardware security module (HSM) circuitry 274, any other suitable circuitry, or any combination thereof. It will be understood, however, that additional components providing additional functionality may be included in the apparatus 280 without departing from the scope of the present disclosure. The apparatus 280 may be involved in execution of various operations described above with respect to FIGS. 1 and 2A and below with respect to FIGS. 4-6C.

In some embodiments, such as in embodiments where the apparatus 280 is a classical, non-PQC device that does not include PQC cryptographic circuitry, the apparatus 280 may be modified to include PQC shim circuitry 260. The PQC shim circuitry 260 may include hardware components designed or configured to allow communication with a PQC callback (e.g., PQC callback circuitry 207 shown in FIG. 2A). The PQC shim circuitry 260 includes hardware components designed or configured to request, receive, process, generate, and transmit data, data structures, control signals, and electronic information for use in PQC. For example, PQC shim circuitry 260 may be configured to provide PQC communications channel-based cryptographic techniques, such as the transmission and receipt of sensitive portions (e.g., payloads) of electronic communications to a PQC callback over one or more PQC communications channels. In some embodiments, the PQC shim circuitry 260 may be installed in a network layer of the apparatus 280. In some embodiments, the PQC shim circuitry 260 may comprise the PQC cryptographic circuitry 252.

In some embodiments, the first portion of the electronic communication may comprise a PQC request data structure indicative of a request for an acknowledgment or confirmation that the client device (e.g., the apparatus 280) is configured to communicate over a PQC communications channel. The client device may be configured to communicate over a PQC communications channel if the client device, or a PQC add-on device (e.g., apparatus 290 shown in FIG. 3C) coupled to the client device, comprises the PQC cryptographic circuitry 252, either without the PQC shim circuitry 260 or as a part of the PQC shim circuitry 260. For example, the classical communications circuitry 210 may be configured to receive the first portion of the electronic communication comprising the PQC request data structure from the server device (e.g., the apparatus 200 shown in FIG. 2A) over the non-PQC communications channel.

In some embodiments, if the client device is configured to communicate over a PQC communications channel, the classical communications circuitry 210 may be configured to transmit, to the server device, a PQC acknowledgement data structure indicating that it is configured to communicate over a PQC communications channel. In response to receipt of the PQC acknowledgement data structure by the server device, the PQC callback circuitry 207 of the server device may be configured to transmit the second portion of the electronic communication to the client device over the PQC communications channel. Subsequently, the PQC cryptographic circuitry 252, either without the PQC shim circuitry 260 or as a part of the PQC shim circuitry 260, may be configured to receive the second portion of the electronic communication from the server device over the PQC communications channel.

In some embodiments, if the client device is not configured to communicate over a PQC communications channel, the classical communications circuitry 210 may be configured to transmit, to the server device, a PQC negative-acknowledgement data structure indicating that it is not configured to communicate over a PQC communications channel. Alternatively, if the client device is not configured to communicate over a PQC communications channel, the classical communications circuitry 210 may be configured to not transmit any response to the server device.

In some embodiments, in response to receipt of the PQC negative-acknowledgement data structure by the server device, or the lack of receipt of a response by the server device after a predetermined time period (e.g., a predetermined period of inactivity or predetermined elapsed time, such as a timeout), the PQC callback circuitry 207 of the server device may be configured to transmit a PQC indicator data structure to the client device over the PQC communications channel. The PQC indicator data structure may comprise a link to a PQC shim configured to allow communication with the PQC callback circuitry 207 over the PQC communications channel. Subsequently, the classical communications circuitry 210 may be configured to transmit, to the server device, a PQC acknowledgement data structure indicating that it is configured to communicate over a PQC communications channel.

In some embodiments, the PQC indicator data structure may further identify the quantum communications channel and indicate that a quantum cryptographic key is to be transmitted over the quantum communications channel. The PQC indicator data structure may comprise a link or pointer to the quantum communications channel, a header that identifies the quantum communications channel and comprises other identification and routing information. In some embodiments, the PQC indicator data structure may comprise a link to the quantum cryptographic key. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a quantum flag value. In another example, the PQC indicator data structure may comprise a link to a quantum electronic agreement (e.g., a bilateral agreement between the PQC system and the client device to exchange quantum information over the quantum communications channel) comprising the PQC indicator data structure.

In some embodiments, the first portion of the electronic communication may comprise a quantum request data structure indicative of a request for an acknowledgment or confirmation that the client device (e.g., the apparatus 280) is configured to communicate over a quantum communications channel. The client device may be configured to communicate over a quantum communications channel if the client device, or a PQC add-on device (e.g., apparatus 290 shown in FIG. 3C) coupled to the client device, comprises the quantum communications circuitry 212. For example, the classical communications circuitry 210 may be configured to receive the first portion of the electronic communication comprising the quantum request data structure from the server device (e.g., the apparatus 200 shown in FIG. 2A) over the non-PQC communications channel.

In some embodiments, if the client device is configured to communicate over a quantum communications channel, the classical communications circuitry 210 may be configured to transmit, to the server device, a quantum acknowledgement data structure indicating that it is configured to communicate over a quantum communications channel. In response to receipt of the quantum acknowledgement data structure by the server device, the quantum communications circuitry 212 of the server device may be configured to transmit the quantum cryptographic key to the client device over the quantum communications channel. The quantum communications circuitry 212 may be configured to receive the quantum cryptographic key from the server device over the quantum communications channel. Subsequently, the cryptographic circuitry 248 may be configured to authenticate a session (e.g., perform a cryptographic handshake) with the client device over the non-PQC communications channel based on the quantum cryptographic key that was transmitted to the client device over the quantum communications channel.

In some embodiments, if the client device is not configured to communicate over a quantum communications channel, the classical communications circuitry 210 may be configured to transmit, to the server device, a quantum negative-acknowledgement data structure indicating that the client device is not configured to communicate over a quantum communications channel. Alternatively, if the client device is not configured to communicate over a quantum communications channel, the classical communications circuitry 210 may be configured to not transmit any response to the server device. In some embodiments, in response to receipt of the quantum negative-acknowledgement data structure by the server device, or the lack of receipt of a response by the server device after a predetermined time period (e.g., a predetermined period of inactivity or predetermined elapsed time, such as a timeout), the quantum communications circuitry 212 of the server device may be configured to not transmit the quantum cryptographic key or the second portion of the electronic communication to the client device.

The gateway circuitry 264 includes hardware components designed or configured to request, receive, process, generate, and transmit data, data structures, control signals, and electronic information for use in PQC. In some embodiments, the gateway circuitry 264 may be configured to provide transactions management, payment processing, any other suitable functionality, and any combination thereof for one or more POS or other devices communicatively coupled to the apparatus 280.

The concentrator circuitry 266 includes hardware components designed or configured to request, receive, process, generate, and transmit data, data structures, control signals, and electronic information for use in PQC. In some embodiments, the concentrator circuitry 266 may be configured to connect multiple POS or other devices to the apparatus 280. For example, the concentrator circuitry 266 may be configured to provide communications management, connectivity, any other suitable functionality, and any combination thereof for one or more POS or other devices communicatively coupled to the apparatus 280.

The store controller circuitry 268 includes hardware components designed or configured to request, receive, process, generate, and transmit data, data structures, control signals, and electronic information for use in PQC. In some embodiments, the store controller circuitry 268 may be configured to provide applications, services, any other suitable functionality, and any combination thereof for one or more POS or other devices communicatively coupled to the apparatus 280.

The terminal manager circuitry 270 includes hardware components designed or configured to request, receive, process, generate, and transmit data, data structures, control signals, and electronic information for use in PQC. In some embodiments, the terminal manager circuitry 270 may be configured to provide terminal management, terminal monitoring, terminal control, terminal updating, any other suitable functionality, and any combination thereof for one or more POS or other devices communicatively coupled to the apparatus 280.

The POS software upgrade circuitry 272 includes hardware components designed or configured to request, receive, process, generate, and transmit data, data structures, control signals, and electronic information for use in PQC. In some embodiments, the POS software upgrade circuitry 272 may be configured to provide software upgrading functionality, proxy upgrade functionality (e.g., upgrade to a PQC or PQC-related proxy), any other suitable functionality, and any combination thereof for one or more POS or other devices communicatively coupled to the apparatus 280. In some embodiments, the POS software upgrade circuitry 272 may be configured to upgrade the POS proxy of connected POS.

The HSM circuitry 274 includes hardened, tamper-resistant hardware components designed or configured to request, receive, process, generate, and transmit data, data structures, control signals, and electronic information for use in PQC. In some embodiments, the HSM circuitry 274 may be configured to provide: protection for cryptographic keys, customer personal identification numbers (PINs), magnetic stripe data, EMV (originally Europay, Mastercard, and Visa) chip data, and mobile application counterparts thereof (e.g., virtual debit cards and credit cards stored in a user's mobile wallet); native cryptographic support for card scheme payment applications; any other suitable functionality; and any combination thereof for one or more POS or other devices communicatively coupled to the apparatus 280. In some embodiments, the HSM circuitry 274 may be configured to provide: personal identification number (PIN) generation, management and validation; PIN block translation during the network switching of ATM and POS transactions; card, user, and cryptogram validation during payment transaction processing; payment credential issuing for payment cards and mobile applications; point-to-point encryption (P2PE) key management and secure data decryption; secure key sharing with third parties to facilitate secure communications; any other suitable functionality; and any combination thereof.

It should also be appreciated that, in some embodiments, each of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, POS software upgrade circuitry 272, and HSM circuitry 274 may include a separate processor, specially configured FPGA, ASIC, or cloud utility to perform the above functions.

In some embodiments, the hardware components described above with reference to cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, POS software upgrade circuitry 272, and HSM circuitry 274, may, for instance, utilize communications circuitry 208 or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more portions of apparatus 200 shown in FIG. 2A), the PQC shim circuitry of another apparatus (e.g., the PQC shim circuitry 260 of a separate apparatus implementing one or more portions of apparatus 280), the communications circuitry of another apparatus (e.g., the communications circuitry 208 of a separate apparatus implementing one or more portions of apparatus 200, 280, or 290), each other, or any other suitable circuitry or device.

In some embodiments, one or more of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, POS software upgrade circuitry 272, and HSM circuitry 274 may be hosted locally by the apparatus 280.

In some embodiments, one or more of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, POS software upgrade circuitry 272, and HSM circuitry 274 may be hosted remotely (e.g., by one or more cloud servers) and thus need not physically reside on the apparatus 280. Thus, some or all of the functionality described herein may be provided by a third-party circuitry. For example, the apparatus 280 may access one or more third-party circuitries via a networked connection configured to transmit and receive data and electronic information between the apparatus 280 and the third-party circuitries. In turn, the apparatus 280 may be in remote communication with one or more of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, POS software upgrade circuitry 272, and HSM circuitry 274.

Figure 2C:
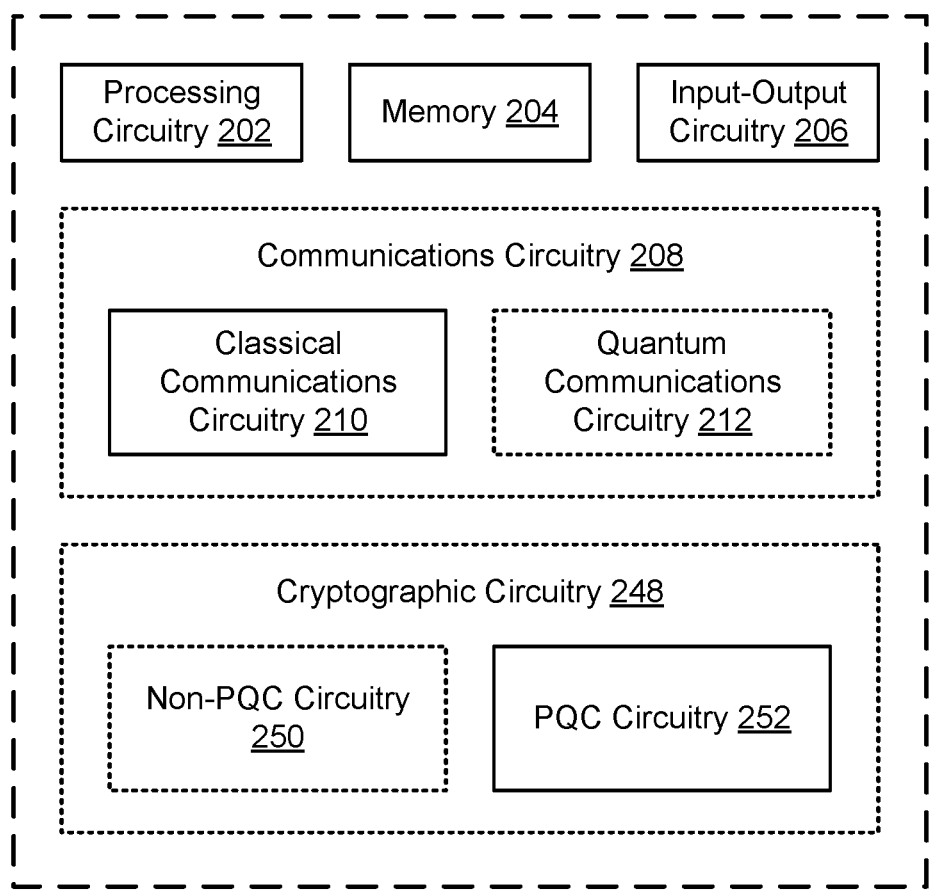

As illustrated in FIG. 2C, an apparatus 290 is shown that represents an example PQC add-on device configured to be communicatively coupled (e.g., wirelessly connected, electrically connected) to a client device, such as a server device 110, client device 112, database server device 114, remote server device 116, any other suitable device, or a combination thereof. In some embodiments, the apparatus 290 may be a PQC peripheral device communicatively coupled to the client device. In some embodiments, the apparatus 290 may be, or comprise, a PQC ASIC installed within a housing of the client device.

In some embodiments, the apparatus 290 may include one or more of processing circuitry 202, memory 204, input-output circuitry 206, communications circuitry 208 (including, but not limited to, classical communications circuitry 210 and quantum communications circuitry 212), cryptographic circuitry 248 (including, but not limited to, non-PQC cryptographic circuitry 250 and PQC cryptographic circuitry 252), any other suitable circuitry, or any combination thereof. It will be understood, however, that additional components providing additional functionality may be included in the apparatus 290 without departing from the scope of the present disclosure. The apparatus 290 may be involved in execution of various operations described above with respect to FIGS. 1 and 2A and below with respect to FIGS. 4-6C.

In some embodiments, the apparatus 290 may hardware components designed or configured to allow communication with a PQC callback (e.g., PQC callback circuitry 207 shown in FIG. 2A). The apparatus 290 includes hardware components designed or configured to request, receive, process, generate, and transmit data, data structures, control signals, and electronic information for use in PQC. For example, the apparatus 290 may be configured to provide PQC communications channel-based cryptographic techniques, such as the transmission and receipt of sensitive portions (e.g., payloads) of electronic communications to a PQC callback over one or more PQC communications channels.

It should also be appreciated that, in some embodiments, each of the cryptographic circuitry 248, non-PQC cryptographic circuitry 250, PQC cryptographic circuitry 252 may include a separate processor, specially configured FPGA, ASIC, or cloud utility to perform the above functions.

In some embodiments, the hardware components described above with reference to cryptographic circuitry 248, non-PQC cryptographic circuitry 250, and PQC cryptographic circuitry 252, may, for instance, utilize communications circuitry 208 or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more portions of apparatus 200 shown in FIG. 2A), the PQC shim circuitry of another apparatus (e.g., the PQC shim circuitry 260 of a separate apparatus implementing one or more portions of apparatus 280 shown in FIG. 2B), the communications circuitry of another apparatus (e.g., the communications circuitry 208 of a separate apparatus implementing one or more portions of apparatus 200, 280, or 290), each other, or any other suitable circuitry or device.

In some embodiments, one or more of the cryptographic circuitry 248, non-PQC cryptographic circuitry 250, PQC cryptographic circuitry 252 may be hosted locally by the apparatus 290.

In some embodiments, one or more of the cryptographic circuitry 248, non-PQC cryptographic circuitry 250, PQC cryptographic circuitry 252 may be hosted remotely (e.g., by one or more cloud servers) and thus need not physically reside on the apparatus 290. Thus, some or all of the functionality described herein may be provided by a third-party circuitry. For example, the apparatus 290 may access one or more third-party circuitries via a networked connection configured to transmit and receive data and electronic information between the apparatus 290 and the third-party circuitries. In turn, the apparatus 290 may be in remote communication with one or more of the cryptographic circuitry 248, non-PQC cryptographic circuitry 250, PQC cryptographic circuitry 252.

Although some of these components of apparatuses 200, 280, and 290 are described with respect to their functional capabilities, it should be understood that the particular implementations necessarily include the use of particular hardware to implement such functional capabilities. It should also be understood that certain of these components may include similar or common hardware. For example, two sets of circuitries may both leverage use of the same processor, network interface, quantum communications interface, optoelectronic components, storage medium, machine learning circuitry, or the like to perform their associated functions, such that duplicate hardware is not required for each set of circuitries. It should also be appreciated that, in some embodiments, one or more of these components may include a separate processor, specially configured FPGA, ASIC, or cloud utility to perform its corresponding functions as described herein.

The use of the term "circuitry" as used herein with respect to components of apparatuses 200, 280, and 290 includes particular hardware configured to perform the functions associated with respective circuitry described herein. While the term "circuitry" should be understood broadly to include hardware, in some embodiments, circuitry may also include software for configuring the hardware. For example, in some embodiments, "circuitry" may include processing circuitry, storage media, network interfaces, quantum interfaces, input-output devices, optoelectronic components, and other components. In some embodiments, other elements of apparatuses 200, 280, and 290 may provide or supplement the functionality of particular circuitry. For example, the processing circuitry 202 may provide processing functionality, memory 204 may provide storage functionality, classical communications circuitry 210 may provide network interface functionality, and quantum communications circuitry 212 may provide quantum interface functionality among other features.

In some embodiments, various components of one or more of the apparatuses 200, 280, or 290 may be hosted remotely (e.g., by one or more cloud servers) and thus need not physically reside on the corresponding apparatus 200, 280, or 290. Thus, some or all of the functionality described herein may be provided by third-party circuitry. For example, a given apparatus 200, 280, or 290 may access one or more third-party circuitries via any sort of networked connection that facilitates transmission of data and electronic information between the apparatus 200, 280, or 290 and the third-party circuitries. In turn, that apparatus 200, 280, or 290 may be in remote communication with one or more of the other components described above as being comprised by the apparatus 200, 280, or 290.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110A-110N, one or more client devices 112A-112N, one or more database server devices 114, and one or more remote server devices 116 described with reference to FIG. 1 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with reference to FIG. 2. Additional description of the mechanics of these components is omitted for the sake of brevity. These device elements, operating together, provide the respective computing systems with the functionality necessary to facilitate the communication of data with the PQC system described herein.

FIGS. 3A, 3B, 3C, 3D, and 3E illustrate example PQC system architectures configured to perform various operations in accordance with some example embodiments described herein.

Figure 3A:
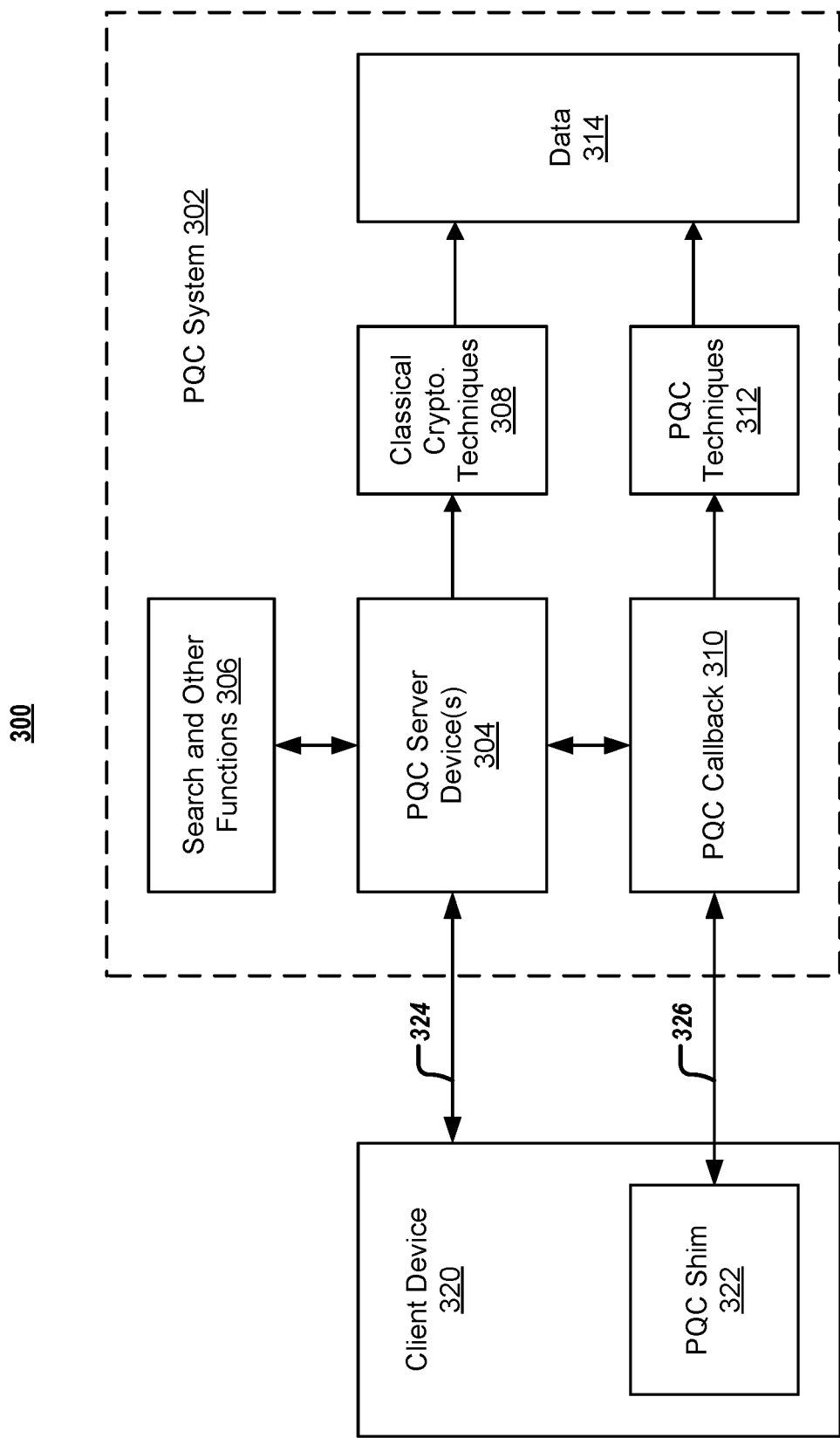
FIGS. 3A, 3B, 3C, 3D, and 3E illustrate example PQC system architectures configured to perform various operations, in accordance with some example embodiments described herein.

FIG. 3A illustrates an example PQC system architecture 300 configured to perform various operations in accordance with some example embodiments described herein. The example PQC system architecture 300 may comprise, for example, PQC system 302 and client device 320.

In some embodiments, the PQC system 302 may comprise, for example, one or more data storage devices 306 comprising search and other functions, one or more PQC server devices 304, one or more non-PQC technique storage devices 308 storing non-PQC techniques and non-PQC cryptographic performance information related thereto, one or more PQC callbacks 310, one or more PQC technique storage devices 312 storing PQC techniques and PQC cryptographic performance information related thereto, and data 314. In some embodiments, the PQC system 302 may be configured to perform PQC in accordance with some example embodiments described herein (e.g., as described with reference to apparatus 200 shown in FIG. 2A).

In some embodiments, the client device 320 may comprise communications circuitry configured to communicate with the one or more PQC server devices 304 over one or more non-PQC communications channels 324. The client device 320 may comprise, for example, a PQC shim 322 configured to communicate with the one or more PQC callbacks 310 over one or more PQC communications channels 326. In some embodiments, the client device 320 may be configured to perform PQC in accordance with some example embodiments described herein (e.g., as described with reference to apparatus 280 shown in FIG. 2B, wherein apparatus 280 comprises the PQC shim circuitry 260, and the PQC shim circuitry 260 comprises the PQC cryptographic circuitry 252).

Figure 3B:
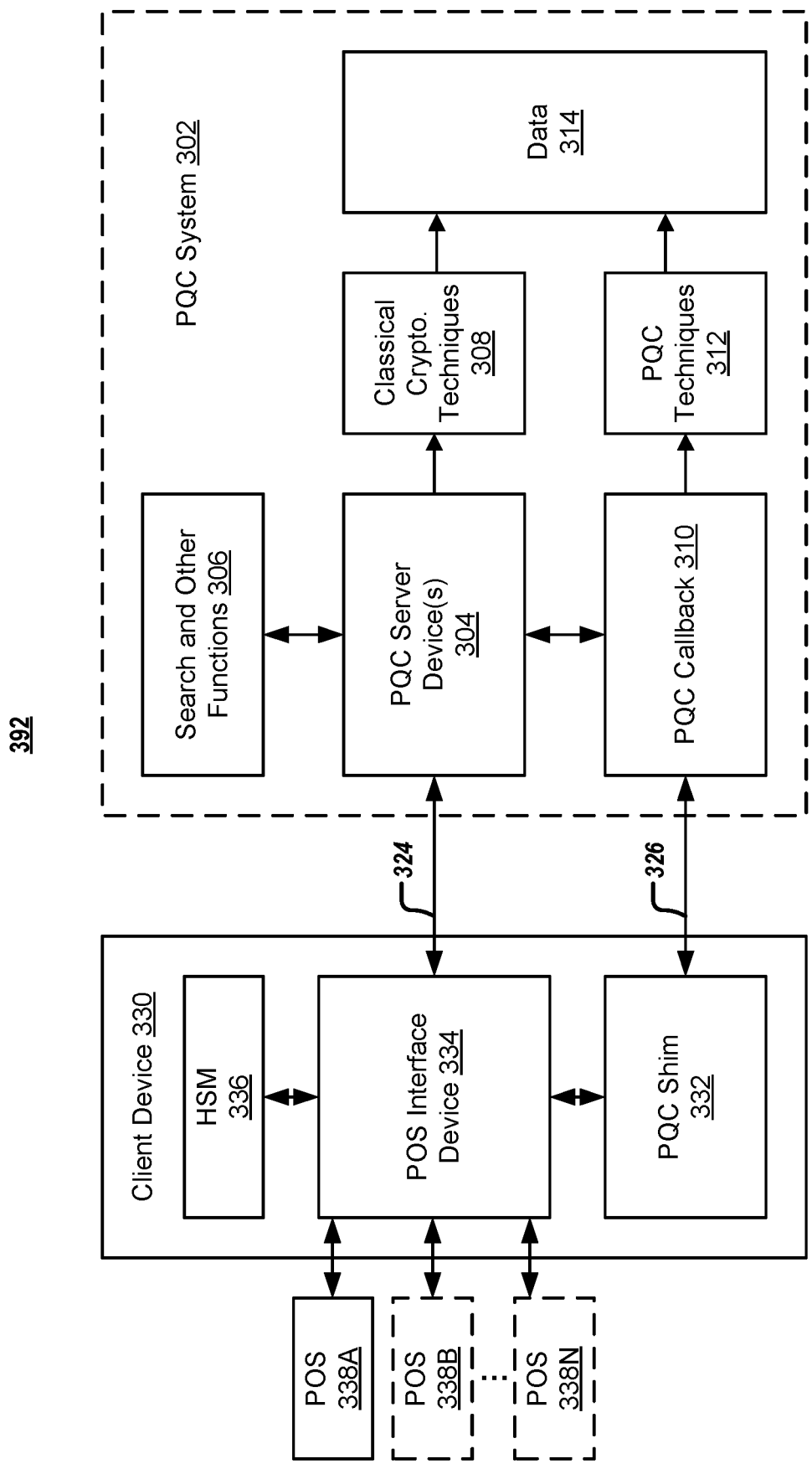

FIG. 3B illustrates an example PQC system architecture 392 configured to perform various operations in accordance with some example embodiments described herein. The example PQC system architecture 392 may comprise, for example, the PQC system 302, a client device 330, and one or more POS 338A-338N.

In some embodiments, the client device 330 may comprise the PQC shim 332, an HSM 336, and a POS interface device 334 comprising a concentrator, gateway, store controller, terminal manager, and upgraded POS proxy. The POS interface device 334 may be configured to communicate with the POS devices 338A-338N over one or more non-PQC communications channels. The POS interface device 334 may be further configured to communicate with the one or more PQC server devices 304 over one or more non-PQC communications channels 324. The PQC shim 322 configured to communicate with the one or more PQC callbacks 310 over one or more PQC communications channels 326. In some embodiments, the client device 330 may be configured to perform PQC in accordance with some example embodiments described herein (e.g., as described with reference to apparatus 280 shown in FIG. 2B, wherein apparatus 280 comprises the PQC shim circuitry 260, and the PQC shim circuitry 260 comprises the PQC cryptographic circuitry 252).

Figure 3C:
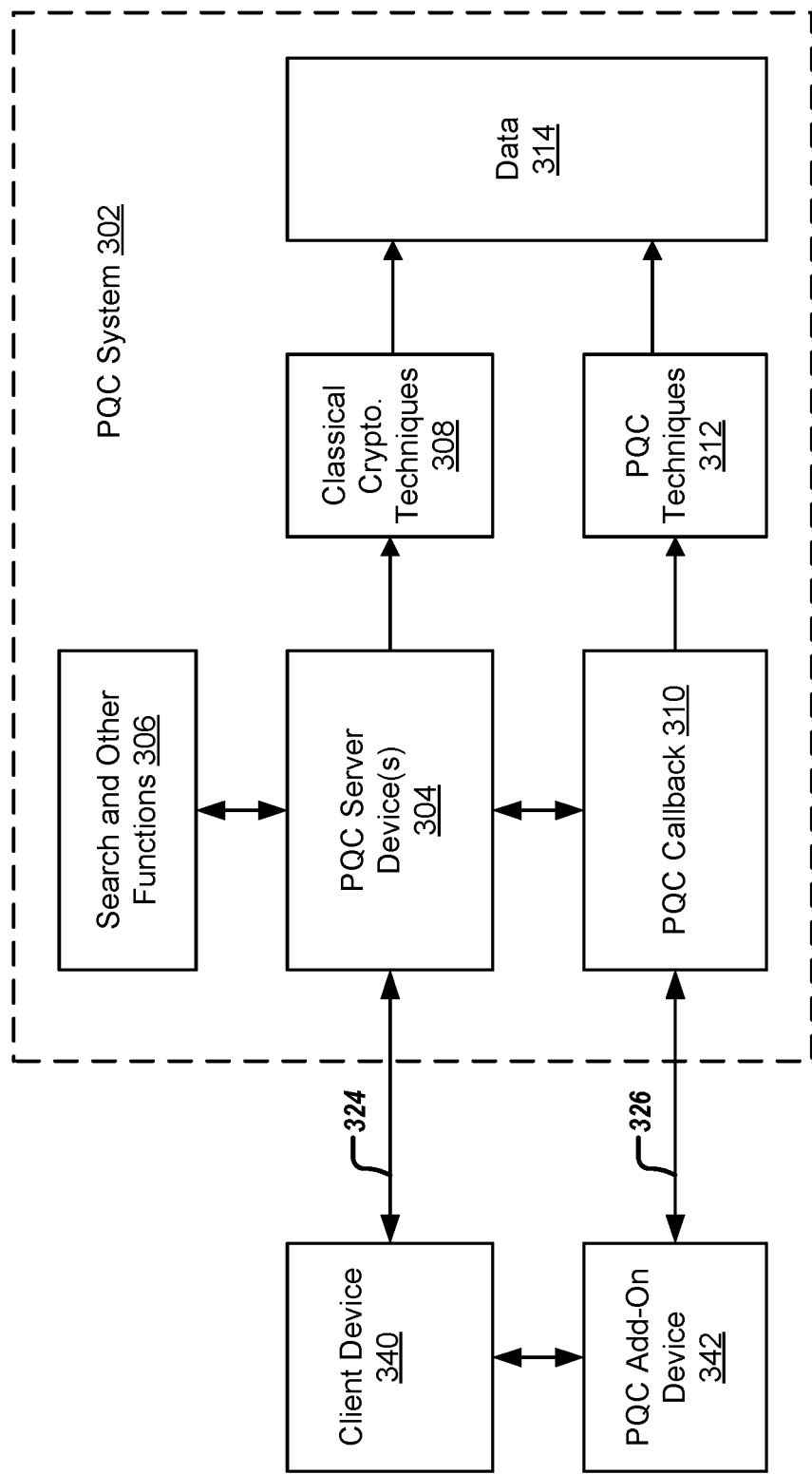

FIG. 3C illustrates an example PQC system architecture 394 configured to perform various operations in accordance with some example embodiments described herein. The example PQC system architecture 394 may comprise, for example, the PQC system 302, a client device 340, and a PQC add-on device 342.

The client device 340 may comprise communications circuitry configured to communicate with the one or more PQC server devices 304 over one or more non-PQC communications channels 324. The PQC add-on device 342 may be communicatively coupled to the client device 340 and configured to communicate with the one or more PQC callbacks 310 over one or more PQC communications channels 326. In some embodiments, the client device 340 may not be configured to perform PQC in accordance with some example embodiments described herein (e.g., as described with reference to apparatus 280 shown in FIG. 2B, wherein apparatus 280 includes neither the PQC cryptographic circuitry 252 nor the PQC shim circuitry 260). In some embodiments, the PQC add-on device 342 may be configured to perform PQC for the client device 340 (e.g., on behalf of the client device 340) in accordance with some example embodiments described herein (e.g., as described with reference to apparatus 290 shown in FIG. 2C).

Figure 3D:
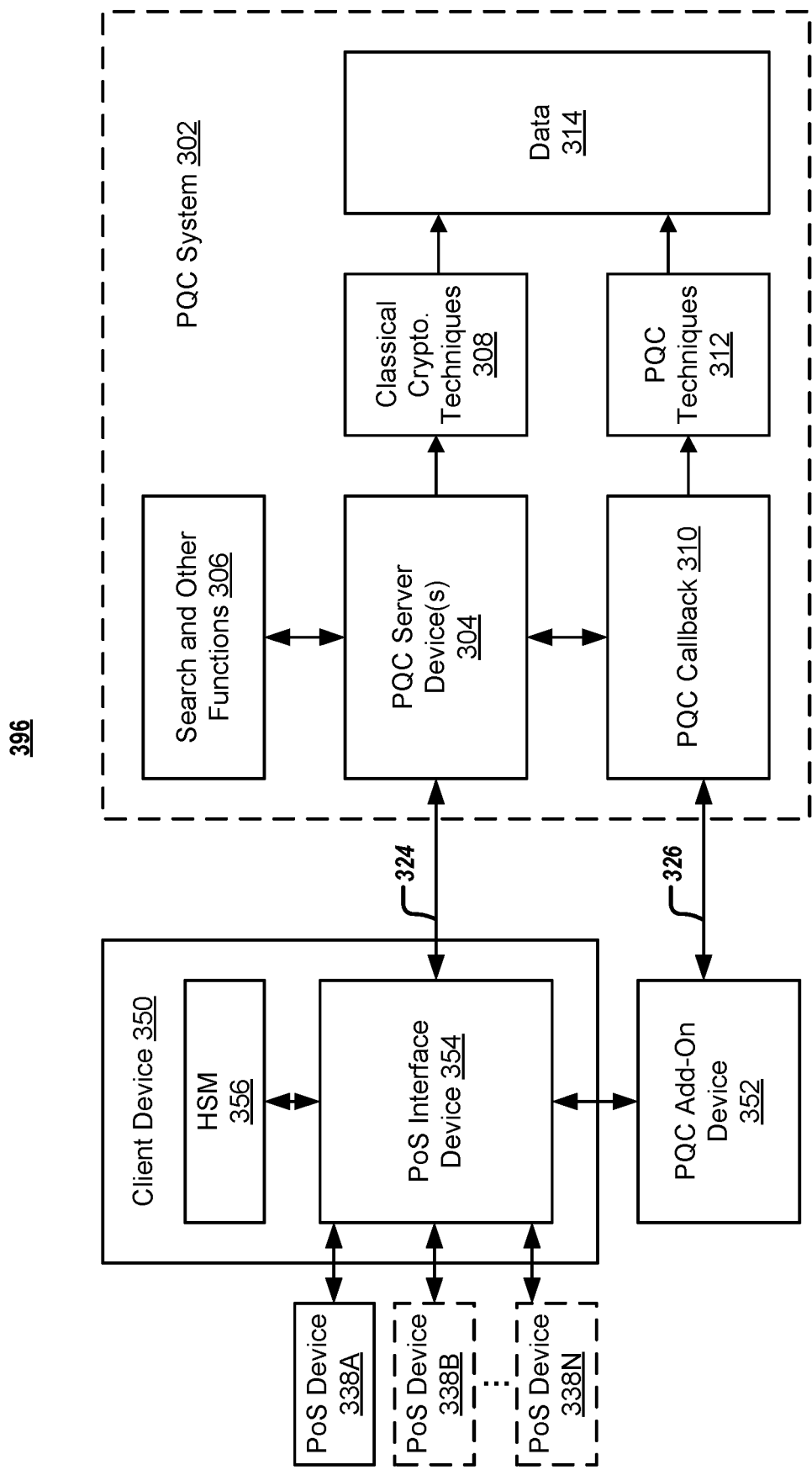

FIG. 3D illustrates an example PQC system architecture 396 configured to perform various operations in accordance with some example embodiments described herein. The example PQC system architecture 396 may comprise, for example, the PQC system 302, a client device 350, a PQC add-on device 352, and one or more POS 338A-338N.

In some embodiments, the client device 350 may comprise an HSM 356 and a POS interface device 354 comprising a concentrator, gateway, store controller, terminal manager, and upgraded POS proxy. The POS interface device 354 may be configured to communicate with the POS 338A-338N over one or more non-PQC communications channels. The POS interface device 354 may be further configured to communicate with the one or more PQC server devices 304 over one or more non-PQC communications channels 324. The PQC add-on device 352 may be communicatively coupled to the client device 350 and configured to communicate with the one or more PQC callbacks 310 over one or more PQC communications channels 326. In some embodiments, the client device 350 may not be configured to perform PQC in accordance with some example embodiments described herein (e.g., as described with reference to apparatus 280 shown in FIG. 2B, wherein apparatus 280 includes neither the PQC cryptographic circuitry 252 nor the PQC shim circuitry 260). In some embodiments, the PQC add-on device 352 may be configured to perform PQC for the client device 350 (e.g., on behalf of the client device 350)

in accordance with some example embodiments described herein (e.g., as described with reference to apparatus 290 shown in FIG. 2C).

Figure 3E:
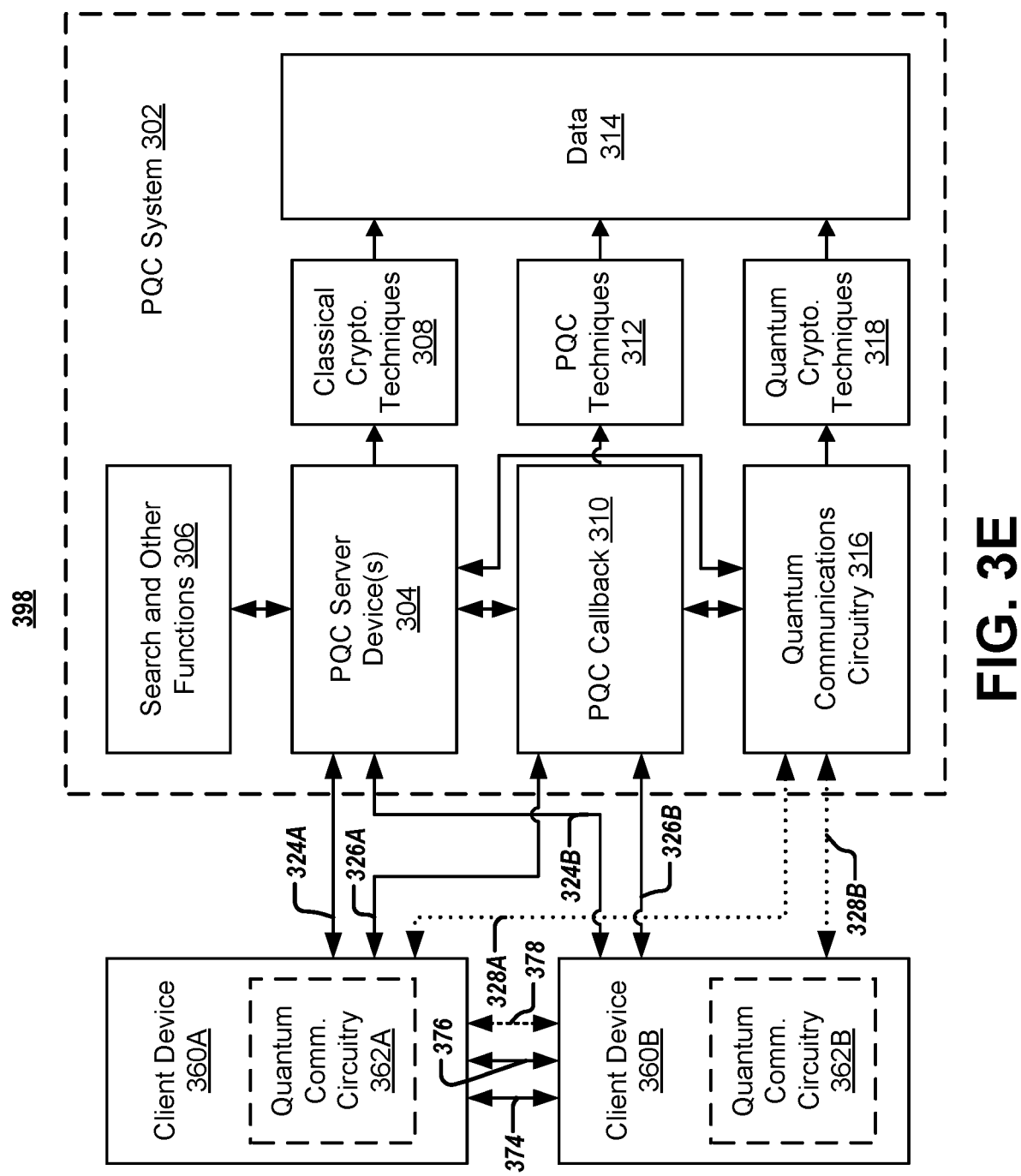

FIG. 3E illustrates an example PQC system architecture 398 configured to perform various operations in accordance with some example embodiments described herein. The example PQC system architecture 398 may comprise, for example, the PQC system 302 and a set of client devices comprising a client device 360A and a second client device 360B. Further to the embodiments shown in FIGS. 3A-3D, the PQC system 302 may further comprise quantum communications circuitry 316 and one or more quantum cryptographic technique storage devices 318 storing quantum cryptographic techniques and quantum cryptographic performance information related thereto.

In some embodiments, the first client device 360A and the second client device 360B may be embodied by any of the client devices shown in FIGS. 3A-3D, such as client device 320; client device 330; client device 340 and PQC add-on device 342; or client device 350 and PQC add-on device 352. Further still to the embodiments shown in FIGS. 3A-3D, the first client device 360A may comprise quantum communications circuitry 362A, and the second client device 360B may comprise quantum communications circuitry 362B. In some embodiments, the first client device 360A may be communicatively coupled to a PQC add-on device comprising the quantum communications circuitry 362A, and the second client device 360B may be communicatively coupled to a PQC add-on device comprising the quantum communications circuitry 362B.

In some embodiments, the client device 360A and the client device 360B may comprise communications circuitry configured to communicate with the one or more PQC server devices 304 over one or more non-PQC communications channels 324A and 324B, respectively, and to communicate with each other over one or more non-PQC communications channels 374. In some embodiments, the client device 360A and the client device 360B may comprise communications circuitry configured to communicate with the one or more PQC callbacks 310 over one or more PQC communications channels 326A and 326B, respectively, and to communicate with each other over one or more PQC communications channels 376. In some embodiments, the client device 360A and the client device 360B may comprise quantum communications circuitry 362A and 362B, respectively, configured to communicate with the quantum communications circuitry 316 over one or more quantum communications channels 328A and 228B, respectively, and to communicate with each other over one or more quantum communications channels 378.

Example Operations for PQC

Various embodiments provide methods, systems, apparatuses, computer program products, and/or the like for securely storing possibly sensitive information/data via an external data repository 120. In various embodiments, an external data repository 120 is operated by and/or on behalf of an entity other than the data owner. In various embodiments, an external data repository 120 comprises computer readable memory (e.g., volatile and/or non-volatile memory) that may be coupled to processing circuitry, communications circuitry, and/or the like. For example, the PQC system 102, PQC server devices 104, PQC databases 106, server devices 110A-110N, client devices 112A-112N, database server devices 114, and/or remote server devices 116 may be operated by a first entity that is the owner of various data/information instances. The first entity may store various data/information instances in the external data repository 120, which is operated by and/or on behalf of a third entity. In an example embodiment, the external data repository 120 may be used to store and/or access various information/data instances by the first entity. In various embodiments, the external data repository 120 may be used to disseminate various information/data instances to one or more second entities that are authorized to access the various information/data instances.

For example, in various embodiments, a PQC system 102, PQC server device 104, PQC database 106, server device 110A-110N, client device 112A-112N, database server device 114, remote server device 116 and/or apparatus 200 may generate one or more blockchains and corresponding side chains. In various embodiments, the PQC system 102, PQC server device 104, PQC database 106, server device 110A-110N, client device 112A-112N, database server device 114, remote server device 116 and/or apparatus 200 may provide the one or more blockchains and corresponding side chains for storage by an external data repository 120. In various embodiments, the PQC system 102, PQC server device 104, PQC database 106, server device 110A-110N, client device 112A-112N, database server device 114, remote server device 116 and/or apparatus 200 may provide information/data instances to be written to one or more blockchains and corresponding side chains and stored by an external data repository 120. In various embodiments, the PQC system 102, PQC server device 104, PQC database 106, server device 110A-110N, client device 112A-112N, database server device 114, remote server device 116 and/or apparatus 200 may access one or more blocks from a blockchain and/or first and/or second side chain blocks from corresponding side chains from external data repository 120.

In various embodiments, a stream of information/data may be written to a blockchain. For example, the stream of information/data may include information/data instances corresponding to transactions, events, and/or the like. In an example embodiment, the stream of information/data is written to the blockchain by a first entity/party computing entity (e.g., a PQC system 102, PQC server device 104, PQC database 106, server device 110, client device 112, database server device 114, remote server device 116, apparatus 200, 280, 290, PQC system 302, and/or client device 320, 330, 340, 350, 360) which is operated by the information/data owner. In an example embodiment, the first entity/party computing entity may generate blocks for the blockchain and the blockchain may be stored (and/or at least a copy of the blockchain) may be stored by an external data repository 120. In various embodiments, two or more side chains may be generated and/or stored by the first entity/party computing entity and/or the external data repository 120.

Figure 4:
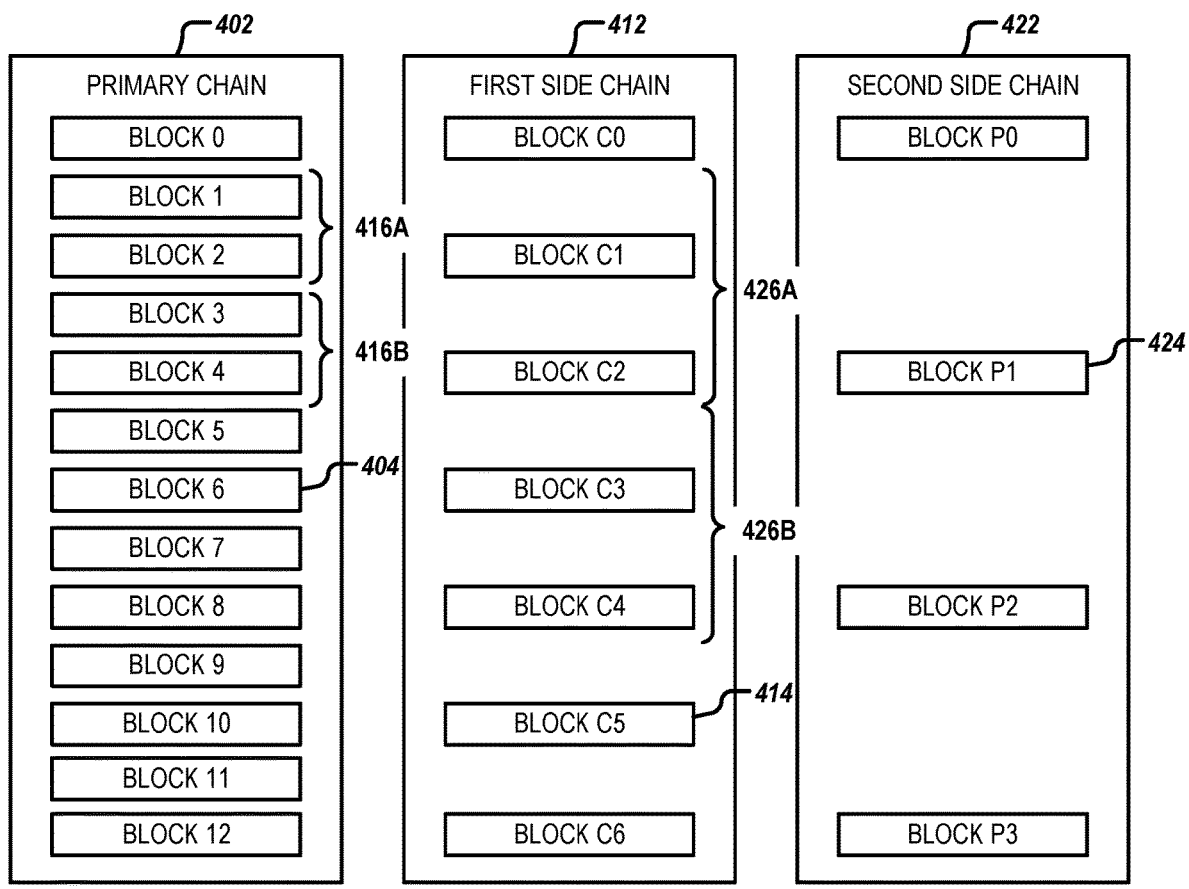
FIG. 4 illustrates an example blockchain and side chain architecture, in accordance with some example embodiments described herein.
Figure 5:
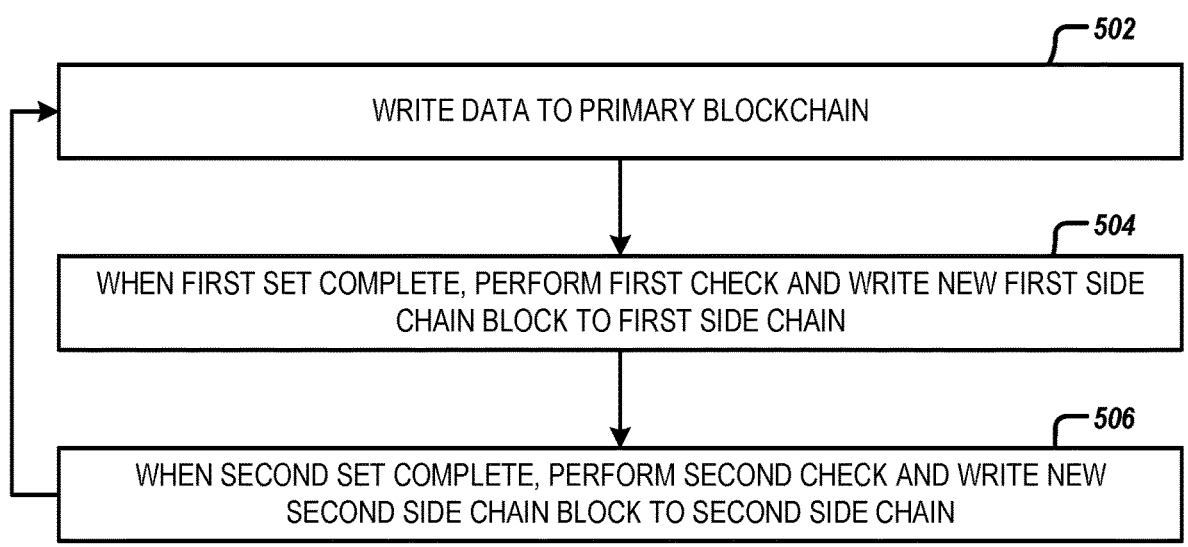
FIG. 5 illustrate an example flowchart for generating a blockchain and corresponding side chains, in accordance with some example embodiments described herein.

FIG. 4 illustrates an example blockchain and side chain architecture 400, in accordance with an example embodiment. In an example embodiment, a blockchain and side chain architecture 400 comprises a primary blockchain 402 and at least two side chains (e.g., first side chain 412 and second side chain 422). In an example embodiment, the primary blockchain 402 is stored by a computing entity operated by the first entity/party (e.g., the data owner of the information/data in the stream of information/data) and the first and/or second side chains 412, 422 are stored in the external data repository 120.

Figure 6A:
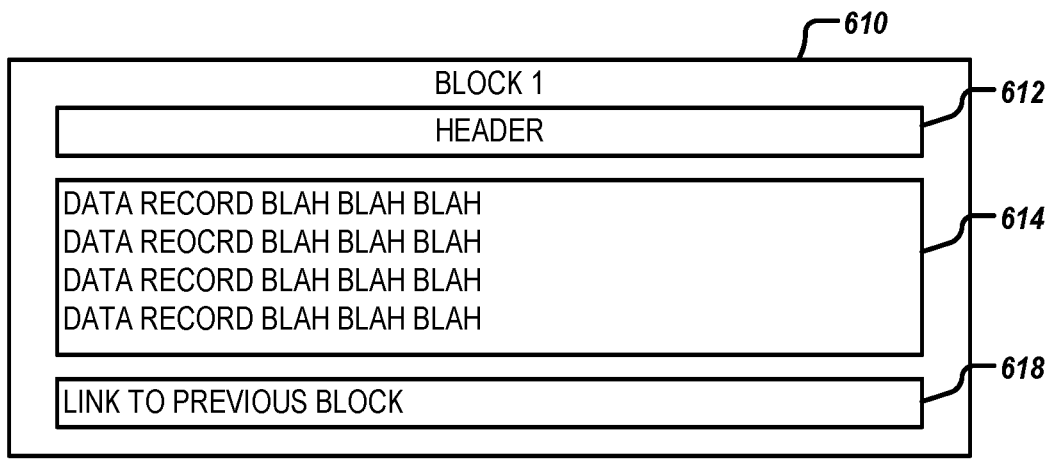
FIG. 6A illustrates an example block of a primary chain of an example blockchain and side chain architecture, in accordance with some example embodiments described herein.

As should be understood, each of the primary blockchain 402, first side chain 412, and second side chain 422 comprise a root block (e.g., Block 0, Block C0, Block P0). The primary blockchain 402 further comprises a plurality of blocks 404 storing instances of information/data from the stream of information/data. FIG. 6A illustrates an example block data structure 610 that may be used for blocks 404, in an example embodiment. For example, the block data structure 610 comprises a header 612, content 614 comprising one or more records each corresponding to an information/data instance from the stream of information/data, and a link 618 that links the block 404 to the immediately previous block in the primary blockchain 402. For example, the link 618 may be a hash value for the immediately previous block 404 in the primary blockchain 402. In various embodiments, the header 612 may comprise metadata corresponding to blockchain 402, the block 404, and/or the content thereof.

The first side chain 412 comprises one or more first side chain blocks 414. In various embodiments, each first side chain block 414 corresponds to a first set 416 (e.g., 416A, 416B) of blocks 404. Each of the first sets 416 of block 404 comprises X blocks, where X is an integer greater than or equal to one. In various embodiments, the first sets 416 are non-overlapping sets and comprise consecutive blocks. For example, a first set 416A corresponding to first side chain block 414 Block C1 comprises blocks 404 Block 1 and Block 2 (and optionally Block 0). However, as the first set 416A does not include Block 3, the first set 416A will not include Block 4. Moreover, first set 416B corresponding to first side chain block 414 Block C2 comprises blocks 404 Block 3 and Block 4. Thus, the first sets 416A and 416B are non-overlapping, meaning that the first sets 416A and 416B do not have any component blocks 404 in common.

Figure 6B:
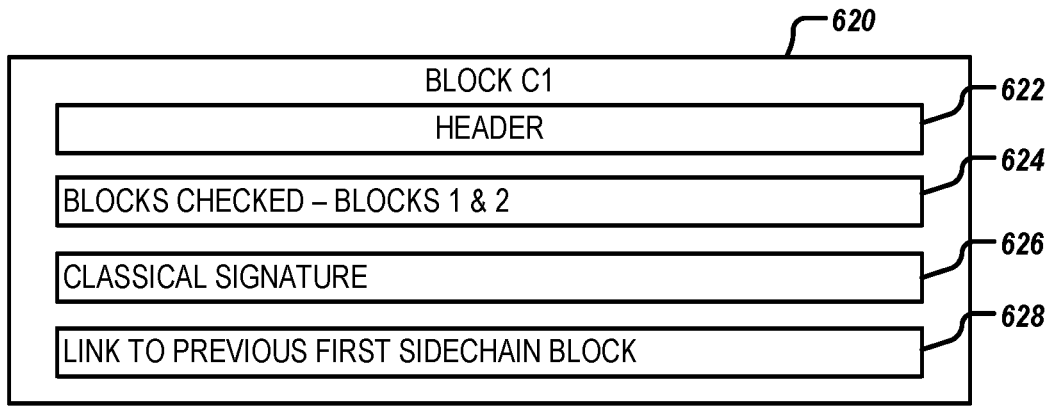
FIG. 6B illustrates an example first side chain block of a first side chain of an example blockchain and side chain architecture, in accordance with some example embodiments described herein.
Figure 6C:
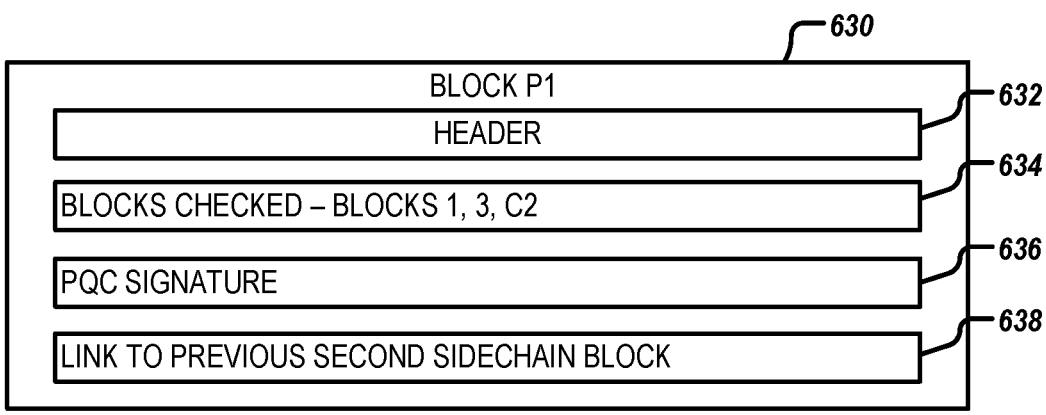
FIG. 6C illustrates an example second side chain block of a second side chain of an example blockchain and side chain architecture, in accordance with some example embodiments described herein.

In various embodiments, the content of a first side chain block 414 may comprise content and/or a verification of the content of one or more blocks of the first set 416 of blocks 404 that correspond to the first side chain block 414. For example, a first side chain block 414 may comprise a verification of the content of one or more blocks 404 of the first set 416 corresponding to the first side chain block 414, encrypted information/data instances from the one or more blocks 404 of the set 416 corresponding to the first side chain block 414, and/or the like. For example, FIG. 6B illustrates an example first side chain block data structure 620 that may be used for blocks 414, in an example embodiment. For example, the first side chain block data structure 620 comprises a header 622, content 624 comprising encrypted versions of one or more records from one or more block 404 of the first set 416 corresponding to the first side chain block 414 ad/or an indication of which blocks 404 of the first set 416 corresponding to the first side chain block 414 were verified, a signature 626, and a link 628 that links the block 414 to the immediately previous first side chain block 614 in the first side chain 412. For example, the link 628 may be a hash value for the immediately previous first side chain block 414 in the first side chain 412. In various embodiments, the header 622 may comprise metadata corresponding to the first side chain 412, the first side chain block 414, and/or the content thereof. In an example embodiment, the content 624 of a first side chain block 414 comprises a hash of one or more blocks 404 in the first set 416 corresponding to the first side chain block 414 or a hash of one or more records of one or more blocks 404 in the first set 416 corresponding to the first side chain block 414. In an example embodiment, the signature 626 is a cryptographic signature applied to the first side chain block 614. For example, the first side chain block 614 may be signed using a first digital signature algorithm. In an example embodiment, the signature 626 and/or any cryptographic technique used to encrypt the content 624 of the first side chain block 614 is a classical and/or non-PQC technique. For example, the first digital signature algorithm may be a classical and/or non-PQC digital signature algorithm.

The second side chain 422 comprises one or more second side chain blocks 424. In various embodiments, each second side chain block 424 corresponds to a second set 426 (e.g., 426A) of first side chain blocks 414 and/or blocks 404. Each of the second sets 426 of first side chain blocks 414 and/or blocks 404 corresponds to Y blocks 404 of the primary blockchain 402. In various embodiments, Y is an integer that is greater than or equal to X. In various embodiments, the second sets 426 are non-overlapping sets and comprise consecutive blocks 404 and/or first side chain blocks 414. For example, a second set 426A corresponding to second side chain block 424 Block P1 comprises blocks 404 Blocks 1-4 and first side chain blocks 414 Blocks C1 and C2 (and optionally Block 0 and/or Block C0). However, as the second set 426A does not include Block 5 or Block C3, the second set 426A will not include Block 6 or Block C4. Moreover, second set 416B corresponding to second side chain block 424 Block P2 comprises blocks 404 Blocks 5-8 and/or first side chain blocks 414 Blocks C3 and C4. Thus, the second sets 426A and 426B are non-overlapping, meaning that the second sets 426A and 426B do not have any component blocks 404 and/or component first side chain blocks 414 in common. However, each second set 426 will overlap at least in part with at least one first set 416.

In various embodiments, the content of a second side chain block 424 may comprise content and/or a verification of the content of one or more blocks 404 and/or first side chain blocks 414 of the set 426 of blocks 404 and/or first side chain blocks 414 that correspond to the second side chain block 424. For example, a second side chain block 424 may be comprise a verification of the content of one or more blocks 404 and/or first side chain blocks 414 of the second set 426 corresponding to the second side chain block 424, encrypted information/data instances from the one or more blocks 404 and/or first side chain blocks 414 of the second set 426 corresponding to the second side chain block 424, and/or the like.

For example, FIG. 8C illustrates an example second side chain block data structure 630 that may be used for second side chain blocks 424, in an example embodiment. For example, the second side chain block data structure 630 comprises a header 632, content 634 comprising encrypted versions of one or more records from one or more block 404 and/or first side chain blocks 414 of the second set 426 corresponding to the second side chain block 424 ad/or an indication of which blocks 404 and/or first side chain blocks 414 of the second set 426 corresponding to the second side chain block 424 were verified, a signature 636, and a link 638 that links the block 424 to the immediately previous block in the second side chain 422. For example, the link 628 may be a hash value for the immediately previous second side chain block 424 in the second side chain 422. In various embodiments, the header 632 may comprise metadata corresponding to the second side chain 422, the second side chain block 424, and/or the content thereof. In an example embodiment, the content 634 of a second side chain block 424 comprises a hash of one or more blocks 404 and/or a hash of one or more first side chain blocks 414 in the second set 426 corresponding to the second side chain block 414 or a hash of one or more records of one or more blocks 404 and/or first side chain blocks 414 in the second set 426 corresponding to the second side chain block 424.

In an example embodiment, the signature 636 is a cryptographic signature applied to the second side chain block 624. For example, the second side chain block 624 may be signed using a second digital signature algorithm. In an example embodiment, the signature 636 and/or any cryptographic technique used to encrypt the content 634 of the second side chain block 624 is a PQC technique. In an example embodiment, the signature 636 and/or the PQC technique may be determined based on the states of one or more quantum particles that are confined, for example, by PQC cryptographic circuitry 252. In an example embodiment, the signature 636 and/or any cryptographic technique used to encrypt the content 634 of the second side chain block 624 is a PQC technique. For example, the second digital signature algorithm may be a PQC digital signature algorithm. In various embodiments, the number of blocks 404 of the primary blockchain 402 in a first set 416 is greater than the number of blocks 404 of the primary blockchain 402 in a second set 426 to account for the longer amount of time required to perform PQC techniques and/or to apply PQC signatures to side chain blocks.

In various embodiments, the blocks 404 of the primary blockchain 402 may not be encrypted and/or may be encrypted and/or signed using classical and/or non-PQC techniques. In various embodiments, the first side chain blocks 414 of the first side chain 412 may comprise content encrypted and/or be signed using classical and/or non-PQC techniques. In various embodiments, the second side chain blocks 424 of the second side chain 422 may comprise content encrypted and/or be signed using PQC techniques. Thus, the first and second side chains 412, 422 provide a migration path from classical/non-PQC encryption and/or verification (e.g., signing) of information/data instances stored in the records of a primary blockchain 402 (e.g., via the first side chain 412) to PQC encryption and/or verification (e.g., signing) of information/data instances stored in the records of the primary block chain 402 and/or first side chain 412 (e.g., via the second side chain 422).

FIG. 7 provides a flowchart illustrating processes, procedures, and/or operations of a method 500 that may be performed (e.g., by a first entity/party computing entity) to generate and store a first and second side chains 412, 422 corresponding to a primary blockchain 402. In various embodiments, the first and/or second side chains 412, 422 are stored by an external data repository 120. Starting at step/operation 502, the first entity/party computing entity may write records comprising information/data instances to the primary blockchain 402 (e.g., via processing circuitry 202, memory 204, communication circuitry 208, and/or the like). For example, the first entity/party computing entity may receive, monitor, generate, and/or the like a stream of information/data. Information/data instances may be extracted from the stream of information/data and written to blocks 404 that may then be written to the primary blockchain 402. In an example embodiment, the blocks first entity/party computing entity may use a digital signature algorithm (e.g., a non-PQC digital signature algorithm) to digitally sign one or more blocks 404 of the primary blockchain 402.

At step/operation 504, the first entity/party computing entity may write a first side chain block 414 corresponding to a first set 416 of blocks 404 of the primary blockchain 402 (e.g., via processing circuitry 202, memory 204, communication circuitry 208, and/or the like). For example, the first entity/party computing entity may determine that a new first set 416 of blocks 404 has been added to the primary block chain 402. This new first set 416 of blocks 404 may be used to generate a new first side chain block 414. For example, it may be determined that X blocks 404 have been written to the primary block chain 402 since a first side chain block 414 was written to the first side chain 412 and/or since the last block 404 of the immediately previous first set 416 of blocks 404 was written to the primary blockchain 402. In an example embodiment, this determination may trigger a first check to be performed. In an example embodiment, the first check may include generating a hash of one or more blocks 404 of the first set 416 corresponding to the new first side chain block 414 and comparing that hash to a hash (e.g., link 618) contained in an immediately succeeding block 404. If the hashes match, the first check may determine that the one or more block 404 are verified. In an example embodiment, the one or more blocks 404 of the first set 416 corresponding to the new first side chain block 414 may be signed (e.g., via a digital signature algorithm). In such an embodiment, the first check may comprise validating the public key certificate chain of the certificate used to sign the one or more blocks 404 and verify the signature applied to the one or more blocks 404. Various verifications of the blocks 404 of the first set 416 may be performed in various embodiments, as appropriate for the application.

After completing the first check, the first entity/party computing entity may write a new first side chain block 414 and cause the new first side chain block 414 to be written to the first side chain 412. In an example embodiment, writing a first side chain block 414 to the first side chain 412 requires the first side chain block 414 to pass a consensus and/or voting process, as are generally known in the distributed ledger art, corresponding to the primary blockchain 402 and/or to the first side chain 412 itself. In an example embodiment, first side chain blocks 414 may be written to the first side chain 412 without invocation of a consensus and/or voting process. In various embodiments, writing the first side chain block 414 to the first side chain 412 comprises using a non-PQC technique to encrypt at least a portion of the first side chain block 414. In various embodiments, writing the first side chain block 414 to the first side chain 412 comprises signing the first side chain block 414 using a first digital signature algorithm. In an example embodiment, the first digital signature algorithm is a non-PQC digital signature algorithm.

At step/operation 506, the first entity/party computing entity may write a second side chain block 424 corresponding to a second set 426 of blocks 404 of the primary blockchain 402 and/or the side chain blocks 414 corresponding to the blocks 404 of the second set 426 (e.g., via processing circuitry 202, memory 204, communication circuitry 208, and/or the like). For example, the first entity/party computing entity may determine that a new second set 426 of blocks 404 has been added to the primary block chain 404. This new second set 426 of blocks 404 may be used to generate a new second side chain block 424. For example, it may be determined that Y blocks 404 have been written to the primary block chain 404 since a second side chain block 424 was written to the second side chain 422 and/or since the last block 404 of the immediately previous second set 426 of blocks 404 was written to the primary blockchain 402. In an example embodiment, this determination may trigger a second check to be performed. In an example embodiment, the second check may include generating a hash of one or more blocks 404 of the second set 426 corresponding to the new second side chain block 424 and comparing that hash to a hash (e.g., link 618) contained in an immediately succeeding block 404. In an example embodiment, the second check may include generating a hash of one or more first side chain blocks 414 corresponding to the blocks 404 of the second set 426 corresponding to the new second side chain block 424 and comparing that hash to a hash (e.g., link 628) contained in an immediately succeeding first side chain block 414. If the hashes match, the second check may determine that the one or more blocks 404 and/or first side chain blocks 414 are verified. In an example embodiment, the one or more blocks 404 of the second set 426 corresponding to the new second side chain block 424 may be signed (e.g., via a digital signature algorithm). In such an embodiment, the second check may comprise validating the public key certificate chain of the certificate used to sign the one or more blocks 404 and verify the signature applied to the one or more blocks 404. In various embodiments, the first side chain blocks 414 that correspond to the blocks 404 of the second set 426 corresponding to the new second side chain block 424 are signed (e.g., via a digital signature algorithm) and the second check comprises confirming the signature applied to the first side chain blocks 414 corresponding to the blocks 404 of the second set 426. Various verifications of the blocks 404 of the second set 426 and/or the corresponding first side chain blocks 414 may be performed in various embodiments, as appropriate for the application.

After completing the second check, the first entity/party computing entity may write a new second side chain block 424 and cause the new second side chain block 424 to be written to the second side chain 422. In an example embodiment, writing a second side chain block 424 to the second side chain 422 requires the second side chain block 424 to pass a consensus and/or voting process, as are generally known in the distributed ledger art, corresponding to the primary blockchain 402 and/or to the second side chain 422 itself. In an example embodiment, second side chain blocks 424 may be written to the second side chain 422 without invocation of a consensus and/or voting process. In various embodiments, writing the second side chain block 424 to the second side chain 422 comprises using a non-PQC technique to encrypt at least a portion of the second side chain block 424. In various embodiments, writing the second side chain block 424 to the second side chain 422 comprises signing the second side chain block 424 using a second digital signature algorithm. In an example embodiment, the second digital signature algorithm is a PQC digital signature algorithm. In various embodiments, generating a second side chain block 424 may cause a signature 626 applied to a first side chain block 414 to be encapsulated with a PQC signature within a second side chain block 424.

In various embodiments, the process may continue in a continuous manner. For example, the stream of information/data may continue to be received, generated, monitored, and/or the like such that new blocks 404 are written to the primary blockchain 402 in a continuous manner. In an example embodiment, once another first set 416 of X blocks 042 are added to the primary blockchain 402, a new first side chain block 414 is generated and written to the first side chain 412. In an example embodiment, once another second set 426 of Y blocks 404 are added to the primary blockchain 402, a new second side chain block 424 is generated and written to the second side chain 422. In various embodiments, the integer X may be selected such that time needed to complete the process of generating and writing a new first side chain block 414 to the first side chain 412 is approximately equal to the average length of time that it takes for X block 404 to be written to the primary blockchain 404. In this manner, the first side chain 412 may be updated in real time or near real time with the generation of a first set of blocks 404 of the primary blockchain 402. In various embodiments, the integer Y may be selected such that time needed to complete the process of generating and writing a new second side chain block 424 to the second side chain 422 is approximately equal to the average length of time that it takes for Y block 404 to be written to the primary blockchain 404. In this manner, the second side chain 422 may be updated in real time or near real time with the generation of a second set of blocks 404 of the primary blockchain 402. In various embodiments, a first or second side chain 412, 422 may be generated for an existing blockchain 402. For example, in an example embodiment, the first and/or second side chain blocks 414, 424 may be generated some time (e.g., minutes, hours, days, months, years) after the corresponding blocks 404 of the primary block chain 402.

In various embodiments, the first side chain 412 may be used to perform a verification of information/data stored in the primary blockchain 402 and/or the second side chain 422 may be used to perform verification of information/data stored in the primary blockchain 402 and/or the first side chain 412. In an example embodiment, the first and/or second side chain 412, 422 may be used to verify that the primary blockchain 402 has not be corrupted and/or modified (e.g., via comparison of the first and second side chains, and/or the like). For example, using appropriate cryptographic keys, the first and/or second side chain blocks 414, 424 may be decrypted, hashed, and/or have the signatures 626, 636 thereof verified. Additionally, the second side chain 422 is protected from tampering and/or corruption using at least one PQC technique such that the second side chain 422 may be trusted as a verified source. In an example embodiment, the first and/or second side chain 412, 422 may also be used to track when and by whom blocks of the primary blockchain 402 and/or the first side chain 412 are accessed. Thus, various embodiments, provide for verification of information/data stored in blockchain and/or another ledger, similar to as described U.S. Pat. No. 10,419,209, issued Sep. 17, 2019. However, various embodiments provide the improvements of being able to verify the non-PQC encrypted and/or signed first side chain 412 using the PQC encrypted and/or signed second side chain 422, PQC level protection for information/data and verification that information/data of the primary block chain and/or first side chain have not been tampered with and/or corrupted, and/or provide a migration path from non-PQC techniques for protecting information/data to PQC techniques and/or PQC enabled systems for protecting information/data.

Although various embodiments are described herein as relating to a blockchain, various embodiments may correspond to a variety of ledgers. For example, a primary ledger may be maintained and first and second side ledgers may be generated based thereon. In various embodiments, the primary ledger and/or the first and/or second side ledgers may be distributed ledgers (e.g., local copies of which are stored by a plurality of computing entities). In various embodiments, the ledger may not be a distributed ledger. For example, the primary ledger may be stored only by the first entity/party computing entity (e.g., rather than in a distributed manner by a plurality of computing entities) and the first and/or second side chains may be stored by the external data repository 120.

Encryption Bundle

In various embodiments, an information/data instance may be stored in an external data repository and/or disseminated through an external data repository as part of an encryption bundle. In various embodiments, an encryption bundle comprises an encrypted information/data instance and a decryption application. In various embodiments, a decryption application is a self-contained application that is configured to decrypt the encrypted information/data instance. For example, a plaintext (e.g., in the clear and/or unencrypted text) information/data instance may be encrypted using a particular cryptographic technique and using a particular cryptographic key. A corresponding decryption application may then be generated based on the particular cryptographic technique and the particular cryptographic key. In an example embodiment, generating a decryption application based in part on a particular cryptographic key comprises generating the decryption algorithm based at least in part on a private key that is private counterpart to the particular cryptographic key.

In various embodiments, the encrypted information/data instance and the decryption application are bundled together to form an encryption bundle. For example, the decryption application and encrypted information/data instance may be stored together in a file or folder, stored compressed together in a file or folder, stored within a common data structure, and/or the like. For example, the encryption bundle may be configured to be provided (e.g., transmitted) as a single unit rather than as distinct components.

In various embodiments, the decryption application is self-contained, meaning that the decryption algorithm may be fully executed without the use of any libraries outside of the decryption application. For example, everything needed to fully execute the decryption application is contained within the decryption application and the decryption application need only read the encrypted information/data instance and, possibly, receive at least one credential. In various embodiments, the decryption application is compiled prior to the bundling of the decryption application and the encrypted information/data instance.

As noted previously, the decryption application may be configured to receive at least one credential. For example, execution of the decryption application by the processing circuitry of a computing entity may cause the decryption application to request a passcode, biometric marker, authentication token, and/or other credential. The decryption application may be configured to receive the at least one credential via user interaction with a user interface (e.g., input/output circuitry) of the computing entity, by accessing a credential stored in memory of the computing entity, and/or the like. The decryption application may then use the received at least one credential to authorize the decryption of the encrypted information/data instance. For example, the decryption application may use the received at least one credential to complete a decryption key, decrypt a decryption key, ensure that a user (e.g., human user and/or machine user) is authorized to access the decrypted encrypted information/data instance, and/or the like such that the decryption application may use the decryption key to decrypt the corresponding encrypted information/data instance.

In various embodiments, the encryption bundle is used to disseminate information/data instances in a secure manner. For example, a first party may provide an encryption bundle for storage in an external data repository 120 and provide a second party with the at least one credential. In various embodiments, the first party provides the at least one credential to the second party via a communication channel that does not include the external data repository 120. The second party may then access the encryption bundle from the external data repository 120 and use the at least one credential and the decryption application of the encryption bundle to decrypt the encrypted information/data instance. In various embodiments, an encryption bundle may be used to disseminate information/data instances securely between a first party and one or more second parties, between one second party and one or more other second parties, and/or the like. For example, the encryption bundle may in effect simplify key management for securely sharing/disseminating information/data between multiple parties via an external data repository 120. For example, access to the information/data of the encrypted information/data instance may be managed through out of channel (e.g., via a communication channel that does not include the external data repository 120) sharing of the at least one credential.

In various embodiments, the encryption bundle is a backward compatible. For example, an information/data instance may be encrypted using Encryption Algorithm 1.0. At a later point in time, the standard PQC technique may be Encryption Algorithm 1.7. Thus, various computing entities (e.g., a first entity/party computing entity and/or second entity/party computing entity) may have been updated to encrypted and/or decrypt information/data using Encryption Algorithm 1.7. However, since the decryption application is self-contained, the various computing entities may still decrypt the encrypted information/data from the encryption bundle comprising the decryption algorithm.

FIG. 9 provides a flowchart illustrating various processes, procedures, operations, and/or the like of a method 900 that may be performed by a first entity/party computing entity and/or a second entity/party computing entity (e.g., a PQC system 102, PQC server device 104, PQC database 106, server device 110, client device 112, database server device 114, remote server device 116, apparatus 200, 280, 290, PQC system 302, and/or client device 320, 330, 340, 350, 360) to generate an encryption bundle and provide the encryption bundle for storage by an external data repository 120. Starting at step/operation 902, a first or second entity/party computing entity receives or generates (e.g., via processing circuitry 202, communication circuitry 208, and/or the like) an information/data instance. For example, the information/data instance may be generated and/or received via a stream of information/data (e.g., transaction information/data), based on execution of an application and/or program by the first or second entity party computing entity, received via a communication from another computing entity, and/or the like. In various embodiments, the first or second entity/party computing entity may determine and/or receive an indication that the information/data instance should be encrypted and stored/disseminated as part of an encryption bundle.

At step/operation 904, the first or second entity/party computing entity encrypts the information/data instance (e.g., via processing circuitry 202, cryptographic circuitry 248, and/or the like) to generate an encrypted information/data instance. For example, the information/data instance may be encrypted using a particular cryptographic technique (e.g., a PQC technique). In an example embodiment, the information/data instance is encrypted using the particular cryptographic technique using a particular cryptographic key.

At step/operation 906, the first or second entity/party computing entity generates a decryption application corresponding to the encrypted information/data instance (e.g., via processing circuitry 202, and/or the like). In an example embodiment, the decryption application is generated at least in part based on the particular cryptographic technique. For example, the decryption application may be an application that is configured to decrypt encrypted information/data using a decryption algorithm corresponding to the particular cryptographic technique. In an example embodiment, the decryption application is generated based at least in part on the particular cryptographic key. For example, in an example embodiment, the decryption application comprises the particular cryptographic key and/or a private key that is the private counterpart to the particular cryptographic key. In an example embodiment, the decryption application is generated based on at least one credential. For example, the decryption application may be configured to complete a decryption key (e.g., the particular cryptographic key and/or a private counterpart thereto) based on the at least one credential, decrypt the decryption key based on the at least one credential, determine that a user (e.g., human user or machine user) is authorized to access the decrypted encrypted information/data instance, and/or the like based on receiving the at least one credential.

In an example embodiment, the decryption application is generated based on a pre-programmed application format and/or template. In an example embodiment, the application format and/or template comprises computer executable code configured to perform a decryption algorithm corresponding to the particular cryptographic technique. In an example embodiment, the application format and/or template comprises computer executable code configured to request at least one credential and receive at least one credential. In an example embodiment, the application format and/or template is self-contained, meaning that it does not reference any external libraries. Generating the decryption application may include linking the particular cryptographic key or a private key that is the private counterpart to the particular cryptographic key and the at least one credential to the application format and/or template. The application format and/or template with the particular cryptographic key and/or private counterpart thereof and the at least one credential linked may then be compiled to generate the self-contained decryption application.

At step/operation 908, the first or second entity/party computing entity bundles the encrypted information/data instance and the corresponding decryption application to generate an encryption bundle (e.g., via processing circuitry 202). For example, the encrypted information/data instance and corresponding decryption application may be stored together in a file or folder, stored compressed together in a file or folder, stored within a common data structure, and/or the like to form the encryption bundle.

At step/operation 910, the first or second entity/party computing entity provides (e.g., transmits) the encryption bundle such that the external data repository 120 receives and stores the encryption bundle in memory thereof. For example, the first or second entity/party computing may provide (e.g., via processing circuitry 202, communication circuitry 208, and/or the like) the encryption bundle. The external data repository 120 may receive the encryption bundle and store the encryption bundle. In an example embodiment, the encryption bundle may comprise and/or be associated with metadata comprising authorization information/data. For example, the authorization information/data may indicate which parties/entities are authorized to access the encryption bundle stored in the external data repository 120.

FIG. 10 provides a flowchart illustrating various processes, procedures, operations, and/or the like of a method 1000 that may be performed by a first entity/party computing entity and/or a second entity/party computing entity (e.g., a PQC system 102, PQC server device 104, PQC database 106, server device 110, client device 112, database server device 114, remote server device 116, apparatus 200, 280, 290, PQC system 302, and/or client device 320, 330, 340, 350, 360) to access an information/data instance via an encryption bundle stored by an external data repository 120.

Starting at step/operation 1002, a first or second entity/party computing entity access an encryption bundle stored by the external data repository 120 (e.g., via processing circuitry 202, communications circuitry 208, and/or the like). For example, the first or second entity/party computing entity 120 may provide and/or submit a request for the encryption bundle such that the request is received by the external data repository 120. The external data repository 120 may receive and process the request and, responsive thereto and/or to determining that the first or second computing entity is authorized to receive the encryption bundle (e.g., based on metadata and/or authorization information/data corresponding to the encryption bundle), provide the encryption bundle such that the first or second entity/party computing entity receives the encryption bundle. For example, the first or second entity/party computing entity may receive the encryption bundle.

At step/operation 1004, the first or second entity/party computing entity may initiate execution of the decryption application of the encryption bundle (e.g., via processing circuitry 202, memory 204, and/or the like). For example, the first or second entity/party computing entity may extract, decompress, and/or the like (as appropriate) from the decryption application from the encryption bundle. An executable of the decryption application may be identified (e.g., based on type, file extension, and/or the like associated therewith) and the executable of the decryption application may be initiated. In an example embodiment, the executable of the decryption application is configured to automatically initiate responsive to the decryption application being extracted, decompressed, and/or the like from the encryption bundle.

In an example embodiment, initiating the execution of the decryption application (e.g., the executable of the decryption application) may cause the decryption application to check the memory (e.g., memory 204) of the first or second entity/party computing entity to determine if a copy of the decryption application is present in the memory. In an example embodiment, if the decryption application finds a copy of itself in the memory, the execution of the decryption application may exit and may provide an error. For example, the decryption application may be a one time/single use application (and/or limited use application) that cannot be used multiple times by the same computing entity (e.g., to try different credentials and/or the like). In an example embodiment, the decryption application comprises a counter and the counter may be incremented to indicate that that instance of the decryption application is being executed by the first or second entity/party computing entity. In an example embodiment, the counter may be set to zero or another initial value when the decryption application is generated. In an example embodiment, when the counter reaches a threshold value (e.g., one, two, three, or a certain amount greater than the initial value), the decryption application may, upon initiation of execution thereof and checking of the counter, exit and provide an error. For example, the decryption application may be configured to only execute a certain number of times. Thus, in various embodiments, the decryption application may be configured to prevent unauthorized access to the decrypted encrypted information/data instance caused by a user guessing at the at least one credential.

In various embodiments, initiation of the execution of the decryption application (e.g., an executable of the decryption application) may cause the first or second entity/party computing entity to request at least one credential. For example, the at least one credential may be a passcode, biometric marker, authentication token, and/or other credential. For example, the entity/party that generated the encryption bundle may have provided the first or second entity/party with the at least one credential via a communication channel that does not include the external data repository 120. The first or second entity/party computing entity may provide the request for the at least one credential and receive user input (and/or indication thereof) providing the at least one credential via input-output circuitry 206, UI circuitry 258, and/or the like. In another example, the decryption application may be configured to provide an API call and/or the like to an operating system of the first or second entity/party computing entity to access the at least one credential stored in memory (e.g., memory 204) of the first or second entity/party computing entity.

At step/operation 1006, the first or second entity/party computing entity passes the at least one credential to the decryption application. For example, the at least one credential may be provided to the decryption application. The decryption application may then execute to use the at least one credential to determine that a user (e.g., the first or second entity/party) is authorized to access the decrypted encrypted information/data instance, to use the at least one credential to generate and/or complete a decryption key, to decrypt a decryption key, and/or the like.

At step/operation 1008, the first or second entity/party computing entity continues to execute the decryption application such that the decryption application. For example, the decryption application may access (read, extract, decompress, and/or the like) the encrypted information/data instance of the encryption bundle and use a cryptographic technique and the decryption key (e.g., the particular cryptographic key and/or a private key that is the private counterpart of the particular cryptographic key) to decrypt the encrypted information/data instance. In various embodiments, the decryption application uses a PQC technique to decrypt the encrypted information/data instance.

At step/operation 1010, the first or second entity/party computing entity continues to execute the decryption application such that the decrypted encrypted information/data instance is provided. For example, the decrypted encrypted information/data instance may be provided via a UI (e.g., via input-output circuitry 206, UI circuitry 258, and/or the like). For example, the decrypted encrypted information/data instance may be displayed via a graphical user interface. In another example embodiment, the decrypted encrypted information/data instance may be added (e.g., by processing circuitry 202) to database stored in memory (e.g., memory 204) stored by and/or accessible to the first or second entity/party computing entity. In an example embodiment, the decrypted encrypted information/data instance may be provided to an application or program operating on the first or second entity/party computing entity, for example, to perform and/or process a transaction, and/or the like.

Thus, in various embodiments, an encryption bundle may be used to store information/data in a secure manner with backward compatible decryption abilities. In various embodiments, an encryption bundle may be used to disseminate information/data to between a first party and one or more second parties and/or between two or more second parties via an external data repository 120 operated by a third party without the third-party having access to the content of the information/data and without requiring a complex key management scheme. Moreover, the data stored within an encryption bundle may be safe from cryptanalytic algorithms implemented on a quantum computer due to the use of PQC techniques to encrypt the information/data instance and the limited number of times the decryption application may be executed, in various embodiments.

Technical Advantages

Various embodiments provide a variety of technical advantages. In particular, various embodiments provide technical advantages related to the secure storage of information/data by an external data repository that is not operated by and/or on behalf of the data owner and/or that is only operated in part by and/or on behalf of the data owner (e.g., as may be the case in various distributed ledger and/or blockchain platforms). Moreover, example embodiments provide a migration path from non-PQC techniques for protecting information/data to PQC techniques and/or PQC enabled systems for protecting information/data.

For example, various embodiments provide two or more side chains/ledger for a primary blockchain/ledger. For example, the two or more side chains enable the verification of the non-PQC encrypted and/or signed first side chain using the PQC encrypted and/or signed second side chain. Additionally, various embodiments provide PQC level protection for information/data and/or PQC level verification that information/data of the primary block chain and/or first side chain have not been tampered with and/or corrupted. Additionally, example embodiments provide a migration path from non-PQC techniques for protecting information/data to PQC techniques and/or PQC enabled systems for protecting information/data.

Thus, various embodiments provide technical solutions to the technical problem of securely storing information/data in an external data repository (e.g., cloud-based storage and/or the like) in a manner that is resistant to cryptanalytic algorithms implemented on a quantum computer. Moreover, various embodiments provide technical solutions to technical problems related to cryptographic key management when encrypted information/data is being disseminated via an external data repository and technical problems related to migrating from non-PQC systems and/or data protection protocols to PQC and/or data protection protocols.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the PQC system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for operating a ledger system, the method comprises:
   accessing, by a computing entity, one or more blocks of a blockchain comprising a plurality of blocks, the plurality of blocks comprising one or more non-overlapping first sets of blocks, each first set comprising a first number of consecutive blocks, the one or more blocks being from a particular one of the one or more first sets;
   encrypting, by the computing entity, the content of the one or more blocks using a first cryptographic technique to generate one or more first encrypted block values;
   writing, by the computing entity, a first side chain block comprising the one or more first encrypted block values and a first signature to a first side chain;
   accessing, by the computing entity, at least one of (a) at least one block of a particular second set of one or more second sets of the plurality of blocks or (b) one or more first side chain blocks corresponding to blocks of the particular second set, wherein the second sets are mutually non-overlapping and each comprise a second number of consecutive blocks of the plurality of blocks;
   encrypting, by the computing entity, the content of at least one of (a) the at least one block or (b) the one or more first side chain blocks using a second cryptographic technique to generate at least one second encrypted block value;
   writing, by the computing entity, a second side chain block comprising the at least one second encrypted block value and a second signature to a second side chain.

2. The method of claim 1, wherein the second cryptographic technique is a post quantum encryption.

3. The method of claim 2, wherein the second number is larger than the first number.

4. The method of claim 1, wherein at least one of the first side chain or the second side chain are generated in real time or near real time with respect to blocks of the particular one of the one or more first sets being written to the blockchain.

5. The method of claim 1, wherein each of the blocks of the blockchain, the first side chain, and the second side chain comprise a link to an immediately previous block of the corresponding blockchain, first side chain, and second side chain, respectively.

6. The method of claim 5, wherein the link is a hash of the immediately previous block.

7. The method of claim 1, further comprising:
   receiving, by the computing entity, instances of data; and
   writing, by the computing entity, blocks comprising the instances of data to the blockchain.

8. The method of claim 1, wherein the computing entity performs a verification of at least one of one or more instances of data in the one or more blocks before encrypting the content of the one or more blocks using the first cryptographic technique.

9. The method of claim 1, wherein the computing entity performs a verification of the first signature of a first side chain block before encrypting or the first side chain block using the second cryptographic technique.

10. An apparatus for operating at least a portion of a ledger system, the apparatus comprising:
    processor circuitry configured to:
      access one or more blocks of a blockchain comprising a plurality of blocks, the plurality of blocks comprising one or more non-overlapping first sets of blocks, each first set comprising a first number of consecutive blocks, the one or more blocks being from a particular one of the one or more first sets;
      encrypt the content of the one or more blocks using a first cryptographic technique to generate one or more first encrypted block values;
      write a first side chain block comprising the one or more first encrypted block values and a first signature to a first side chain;
      access at least one of (a) at least one block of a particular second set of one or more second sets of the plurality of blocks or (b) one or more first side chain blocks corresponding to blocks of the particular second set, wherein the second sets are mutually non-overlapping and each comprise a second number of consecutive blocks of the plurality of blocks;

encrypt the content of at least one of (a) the at least one block or (b) the one or more first side chain blocks using a second cryptographic technique to generate at least one second encrypted block value;

write a second side chain block comprising the at least one second encrypted block value and a second signature to a second side chain.

11. The apparatus of claim 10, wherein the second cryptographic technique is a post quantum encryption.

12. The apparatus of claim 11, wherein the second number is larger than the first number.

13. The apparatus of claim 10, wherein at least one of the first side chain or the second side chain are generated in real time or near real time with respect to blocks of the particular one of the one or more first sets being written to the blockchain.

14. The apparatus of claim 10, wherein each of the blocks of the blockchain, the first side chain, and the second side chain comprise a link to an immediately previous block of the corresponding blockchain, first side chain, and second side chain, respectively.

15. The apparatus of claim 14, wherein the link is a hash of the immediately previous block.

16. The apparatus of claim 10, wherein the processing circuitry is further configured to:
receive instances of data; and
write blocks comprising the instances of data to the blockchain.

17. The apparatus of claim 10, wherein the processing circuitry is further configured to perform a verification of at least one of one or more instances of data in the one or more blocks before encrypting the content of the one or more blocks using the first cryptographic technique.

18. The apparatus of claim 10, wherein the processing circuitry is further configured to perform a verification of the first signature of a first side chain block or the first side chain block before encrypting the first side chain block using the second cryptographic technique.

19. A computer program product comprising at least one non-transitory storage media storing executable instructions, the executable instructions comprising executable code portions configured to, when executed by the processing circuitry of an apparatus, cause the apparatus to:

access one or more blocks of a blockchain comprising a plurality of blocks, the plurality of blocks comprising one or more non-overlapping first sets of blocks, each first set comprising a first number of consecutive blocks, the one or more blocks being from a particular one of the one or more first sets;

encrypt the content of the one or more blocks using a first cryptographic technique to generate one or more first encrypted block values;

write a first side chain block comprising the one or more first encrypted block values and a first signature to a first side chain;

access at least one of (a) at least one block of a particular second set of one or more second sets of the plurality of blocks or (b) one or more first side chain blocks corresponding to blocks of the particular second set, wherein the second sets are mutually non-overlapping and each comprise a second number of consecutive blocks of the plurality of blocks;

encrypt the content of at least one of (a) the at least one block or (b) the one or more first side chain blocks using a second cryptographic technique to generate at least one second encrypted block value;

write a second side chain block comprising the at least one second encrypted block value and a second signature to a second side chain.

20. The computer program product of claim 19, wherein the second cryptographic technique is a post quantum encryption and the second number is larger than the first number.

* * * * *